US011852163B2

(12) United States Patent
Kosaka et al.

(10) Patent No.: US 11,852,163 B2
(45) Date of Patent: Dec. 26, 2023

(54) SINGLE SUCTION CENTRIFUGAL BLOWER

(71) Applicant: DENSO CORPORATION, Kariya (JP)

(72) Inventors: Sho Kosaka, Kariya (JP); Shuzo Oda, Kariya (JP); Masanori Yasuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 433 days.

(21) Appl. No.: 17/238,679

(22) Filed: Apr. 23, 2021

(65) Prior Publication Data
US 2021/0239128 A1 Aug. 5, 2021

Related U.S. Application Data

(63) Continuation of application No. PCT/JP2019/039151, filed on Oct. 3, 2019.

(30) Foreign Application Priority Data

Nov. 19, 2018 (JP) ................................. 2018-216355

(51) Int. Cl.
*F04D 29/42* (2006.01)
*F04D 29/44* (2006.01)
(Continued)

(52) U.S. Cl.
CPC ....... *F04D 29/4213* (2013.01); *F04D 29/424* (2013.01); *B60H 2001/00085* (2013.01); *B60H 2001/00135* (2013.01); *F04D 1/006* (2013.01); *F04D 5/007* (2013.01); *F04D 5/008* (2013.01); *F04D 7/02* (2013.01); *F04D 15/0022* (2013.01); *F04D 17/105* (2013.01); *F04D 17/125* (2013.01); *F04D 17/162* (2013.01);
(Continued)

(58) Field of Classification Search
CPC combination set(s) only.
See application file for complete search history.

(56) References Cited

U.S. PATENT DOCUMENTS 6,568,468 B1 * 5/2003 Uemura ............ B60H 1/00692
454/126
2003/0190230 A1 10/2003 Ito
(Continued)

FOREIGN PATENT DOCUMENTS

DE 102016225038 A1 3/2018
EP 3524452 A1 8/2019
(Continued)

*Primary Examiner* — Binh Q Tran
(74) *Attorney, Agent, or Firm* — Harness, Dickey & Pierce, P.L.C.

(57) ABSTRACT

In a cross section of a flow passage formed to conduct a flow of air from an inside/outside air box to an upper air passage of a scroll casing while the cross section of the flow passage is taken along an imaginary plane which includes an outer edge of an air guide plate and is parallel to a rotational axis of an impeller, a passage section, which is located on one radial side of a separation tube where a nose of the scroll casing is placed, is defined as a first opening section, and another passage section, which is located on an opposite radial side of the separation tube, which is opposite to the nose, is defined as a second opening section. A passage cross-sectional area of the second opening section is larger than a passage cross-sectional area of the first opening section.

6 Claims, 18 Drawing Sheets

(51) Int. Cl.
  *F04D 5/00*   (2006.01)
  *F04D 17/12*  (2006.01)
  *F04D 1/00*   (2006.01)
  *F04D 7/02*   (2006.01)
  *F04D 17/16*  (2006.01)
  *F04D 15/00*  (2006.01)
  *F04D 17/10*  (2006.01)
  *F04D 29/24*  (2006.01)
  *F04D 29/22*  (2006.01)
  *B60H 1/00*   (2006.01)

(52) U.S. Cl.
  CPC ...... *F04D 29/2216* (2013.01); *F04D 29/2255* (2013.01); *F04D 29/242* (2013.01); *F04D 29/4226* (2013.01); *F04D 29/4293* (2013.01); *F04D 29/44* (2013.01); *F05D 2250/50* (2013.01); *F05D 2250/52* (2013.01); *F05D 2250/711* (2013.01); *F05D 2250/712* (2013.01)

(56) References Cited

U.S. PATENT DOCUMENTS

| | | | |
|---|---|---|---|
| 2004/0093885 A1* | 5/2004 | Ito | B60H 1/00028 62/204 |
| 2008/0279681 A1* | 11/2008 | Eguchi | F04D 29/444 415/206 |
| 2010/0014965 A1* | 1/2010 | Watanabe | F04D 29/4233 415/204 |
| 2012/0205070 A1* | 8/2012 | Kamiya | B60H 1/00514 165/104.34 |
| 2016/0144685 A1* | 5/2016 | Ochiai | B60H 1/00064 165/204 |
| 2016/0229266 A1* | 8/2016 | Maeda | B60H 1/0005 |
| 2016/0355069 A1 | 12/2016 | Vincent | |
| 2017/0130723 A1* | 5/2017 | Kosaka | F04D 29/687 |
| 2018/0072131 A1 | 3/2018 | Lee et al. | |
| 2019/0293081 A1 | 9/2019 | Imahigashi et al. | |
| 2019/0293082 A1 | 9/2019 | Imahigashi et al. | |

FOREIGN PATENT DOCUMENTS

| | | |
|---|---|---|
| EP | 3530955 A1 | 8/2019 |
| EP | 3567259 A1 | 11/2019 |
| JP | 2000-203235 A | 7/2000 |
| JP | 2001032799 A | 2/2001 |
| JP | 2002019445 A | 1/2002 |
| JP | 2002276880 A | 9/2002 |
| JP | 2003301794 A | 10/2003 |
| JP | 2004132342 A | 4/2004 |
| JP | 2017505397 A | 2/2017 |
| JP | 2017227213 A | 12/2017 |
| JP | 2018035791 A | 3/2018 |
| JP | 2018035792 A | 3/2018 |
| JP | 2018058472 A | 4/2018 |
| JP | 2018091274 A | 6/2018 |
| JP | 2018109383 A | 7/2018 |
| JP | 2019173570 A | 10/2019 |
| JP | 2019173571 A | 10/2019 |
| JP | 2020016229 A | 1/2020 |
| JP | 2020016233 A | 1/2020 |
| WO | WO-2016066739 A1 | 5/2016 |
| WO | WO-2017103358 A1 | 6/2017 |
| WO | WO-2018074339 A1 | 4/2018 |

* cited by examiner

SINGLE SUCTION CENTRIFUGAL BLOWER

CROSS REFERENCE TO RELATED APPLICATIONS

This application is a continuation application of International Patent Application No. PCT/JP2019/039151 filed on Oct. 3, 2019, which designated the U.S. and claims the benefit of priority from Japanese Patent Application No. 2018-216355 filed on Nov. 19, 2018. The entire disclosures of all of the above applications are incorporated herein by reference.

TECHNICAL FIELD

The present disclosure relates to a single suction centrifugal blower.

BACKGROUND

Previously, there has been proposed a single suction centrifugal blower that is operable to simultaneously suction inside air from an inside of a vehicle cabin and outside air from an outside of the vehicle cabin while keeping the inside air and the outside air separated from each other.

SUMMARY

This section provides a general summary of the disclosure, and is not a comprehensive disclosure of its full scope or all of its features.

According to the present disclosure, there is provided a single suction centrifugal blower that is configured to be installed to a two-layer flow air conditioning system and is operable to simultaneously suction inside air from an inside of a vehicle cabin and outside air from an outside of the vehicle cabin while keeping the inside air and the outside air separated from each other. The single suction centrifugal blower is configured such that a flow of air, which is conducted from an inside/outside air box to an air guide plate, is drawn into an air inlet of the air guide plate and flows through an inside of a tubular portion of a separation tube and then flows to a lower air passage of a scroll casing through an impeller, and another flow of air, which is conducted from the inside/outside air box to a region outside of the air guide plate, flows through an outside of the tubular portion and then flows to an upper air passage of the scroll casing through the impeller. In a cross section of a flow passage formed to conduct the flow of the air from the inside/outside air box to the upper air passage while the cross section of the flow passage is taken along an imaginary plane which includes an outer edge of the air guide plate and is parallel to a rotational axis of the impeller, a passage section, which is located on one radial side of the separation tube where a nose of a scroll casing is placed, is defined as a first opening section, and another passage section, which is located on an opposite radial side of the separation tube, which is opposite to the nose, is defined as a second opening section. A passage cross-sectional area of the second opening section is larger than a passage cross-sectional area of the first opening section.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
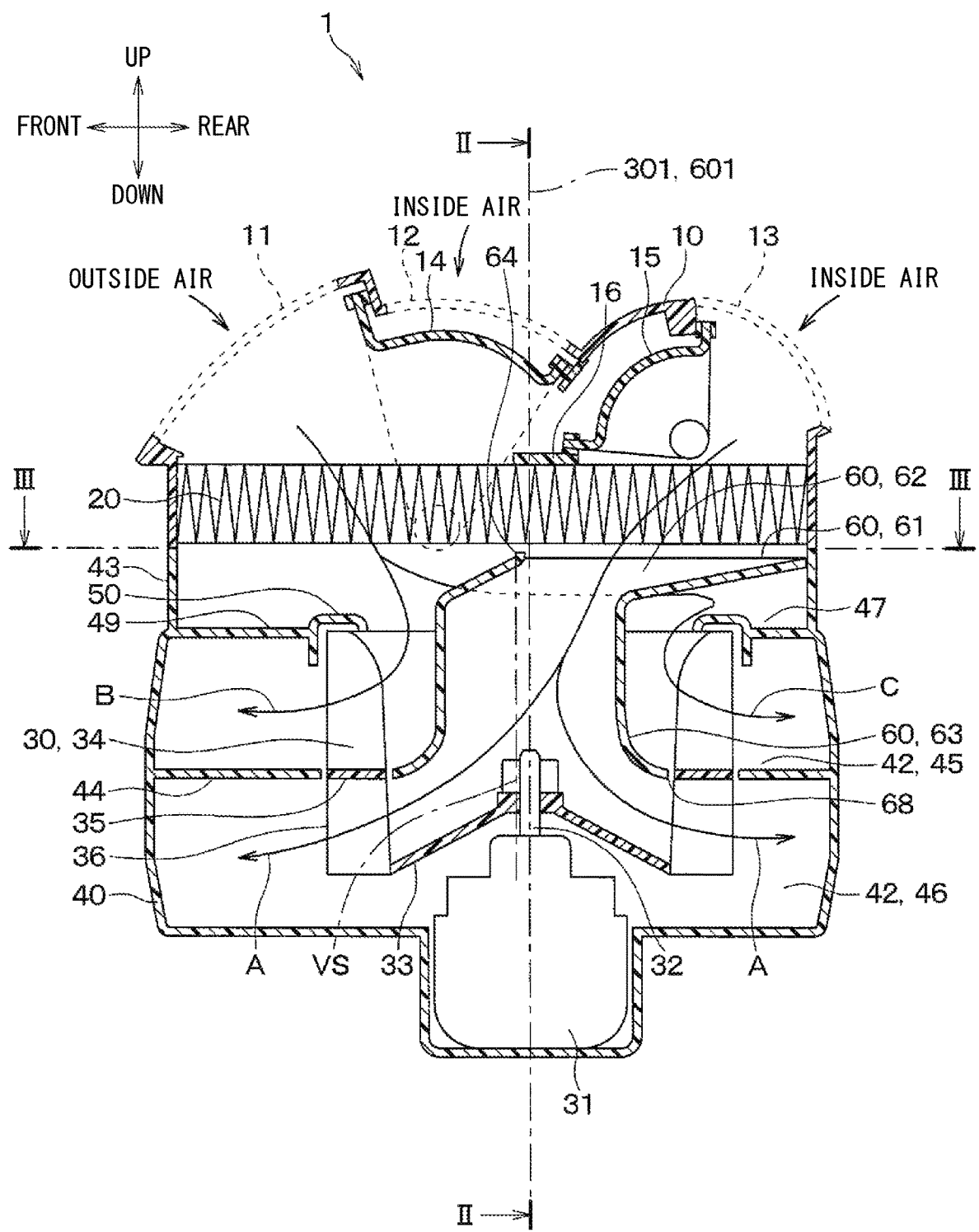
FIG. 1 is a cross-sectional view of a centrifugal blower according to a first embodiment.
Figure 2:
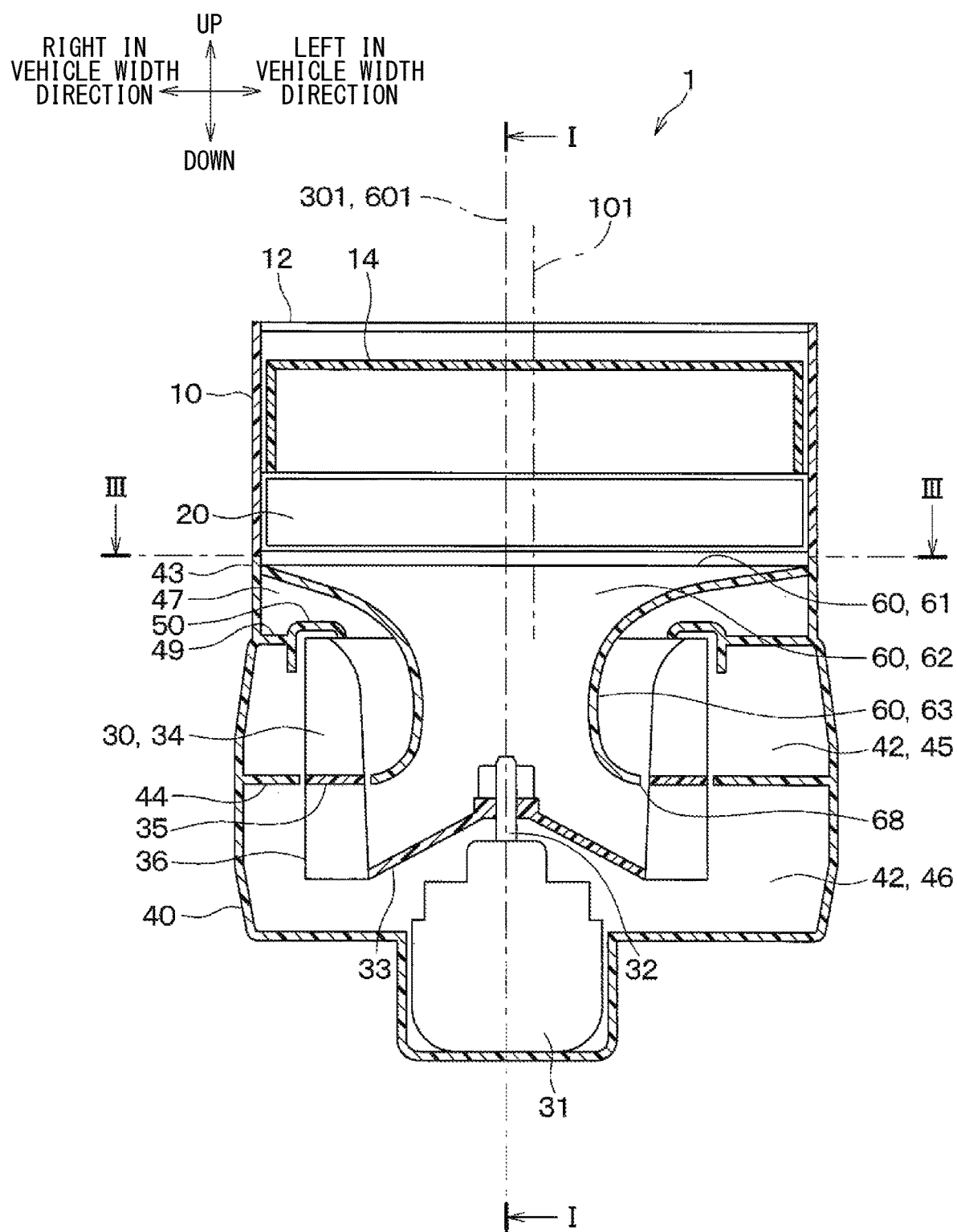
FIG. 2 is a cross-sectional view taken along line II-II in FIG. 1.

Previously, there has been proposed a single suction centrifugal blower that is operable to simultaneously suction inside air from an inside of a vehicle cabin and outside air from an outside of the vehicle cabin while keeping the inside air and the outside air separated from each other.

One previously proposed single suction centrifugal blower is configured such that the air, which is taken from an air intake housing (hereinafter referred to as an inside/outside air box), is drawn into an inside of an impeller through a filter and is discharged to an air passage located on a radially outer side of the impeller. The air passage, which is located on the radially outer side of the impeller, is partitioned by a partition wall into an upper air passage, which is located on one side of the partition wall in the axial direction of the impeller, and a lower air passage, which is located on another side of the partition wall in the axial direction of the impeller. On the radially inner side of the impeller, there is a separation tube for separating and guiding flows of the air taken from the inside/outside air box into the upper air passage and the lower air passage. The separation tube has: an air guide plate which is located in a part of a region between the impeller and the filter; and a tubular portion which extends from an air inlet of the air guide plate through a location on the radially inner side of the impeller and expands outward in the radial direction. With this configuration, the flow of the air, which is conducted from the inside/outside air box, is drawn into the air inlet of the air guide plate and flows through an inside of the tubular portion and then flows to the lower air passage through the impeller. Furthermore, the other flow of the air, which is conducted from the inside/outside air box, flows through an outside of the tubular portion without passing through the air guide plate and then flows to the upper air passage through the impeller. As discussed above, this centrifugal blower is configured to blow the flows of the air, which are drawn from the one side of the impeller in the axial direction, to the upper air passage and the lower air passage.

By the way, in general, in the centrifugal blower, the air passage, which is located on the radially outer side of the impeller, is configured such that a distance between a trailing edge of a blade of the impeller and an inner wall of the scroll casing is narrowest near a nose, and this distance is progressively increased from the nose toward one side in a circumferential direction. Therefore, a pressure loss of the air blown by the impeller into the air passage is large near the nose and gradually decreases from the nose toward the one side in the circumferential direction. Thus, a flow amount of the air drawn into the impeller is small near the nose and is progressively increased from the nose toward the one side in the circumferential direction.

With respect to this, in the previously proposed centrifugal blower described above, it is not known about a flow of the air, which flows to a flow passage on a rear side of the separation tube (i.e., a flow passage formed between the air guide plate and the bellmouth) from outer left and right opening sections of a tubular portion of the separation tube. Furthermore, in the previously proposed centrifugal blower described above, a passage cross-sectional area of an opening section located on a left side of the tubular portion of the separation tube is the same as a passage cross-sectional area of an opening section located on a right side of the tubular portion of the separation tube. In such a case, the pressure loss of the air passing through the opening section far from the nose will be larger than the pressure loss of the air passing through the opening section near the nose. If the balance between the pressure loss of the air passing through the opening section far from the nose and the pressure loss of the air passing through the opening section near the nose does not correspond to the flow amount characteristic of the air drawn into the impeller, the flow amount of the air flowing through the flow passage located on the rear side of the separation tube will be reduced. As a result, the flow amount of the air drawn from the flow passage located on the rear side of the separation tube into the impeller will be reduced, and thereby a blowing efficiency of the blower may possibly be reduced.

In the previously proposed centrifugal blower described above, when a gap between the air guide plate and the bellmouth is reduced to reduce a size of the centrifugal blower measured in the axial direction of the rotational axis of the impeller (e.g., a size of the centrifugal blower measured in a height direction of the centrifugal blower), this effect is disadvantageously increased.

According to one aspect of the present disclosure, there is provided a single suction centrifugal blower that is configured to be installed to a two-layer flow air conditioning system and is operable to simultaneously suction inside air from an inside of a vehicle cabin and outside air from an outside of the vehicle cabin while keeping the inside air and the outside air separated from each other, the centrifugal blower including:

an inside/outside air box that has an outside-air inlet, into which the outside air from the outside of the vehicle cabin is introduced, and an inside-air inlet, into which the inside air from the inside of the vehicle cabin is introduced;

an impeller that is configured to be rotated by an electric motor such that the impeller suctions air introduced into the inside/outside air box from one side of the impeller in an axial direction of a rotational axis of the impeller and discharges the air toward an outer side of the impeller in a radial direction of the impeller;

a scroll casing that surrounds the impeller from a radially outer side of the impeller, wherein the scroll casing forms an air passage having a passage cross-sectional area that is progressively increased from a nose, which is formed at a portion of an outer periphery of the scroll casing, toward one side in a circumferential direction of the scroll casing;

a bellmouth that is shaped in a form of a ring and is formed at an end surface of the scroll casing located at an end of the scroll casing in the axial direction of the impeller, wherein the bellmouth forms a suction inlet through which the air is drawn toward the impeller;

a partition wall that partitions the air passage, which is located on an outer side of the impeller in the radial direction, into an upper air passage, which is located on one side of the partition wall in the axial direction of the impeller, and a lower air passage, which is located on another side of the partition wall in the axial direction of the impeller; and a separation tube that has:
  an air guide plate which is located in a part of a region on a side of the impeller where the inside/outside air box is placed; and
  a tubular portion which extends from an air inlet of the air guide plate through a location on a radially inner side of the impeller and expands outward in the radial direction, wherein:

a flow of the air, which is conducted from the inside/outside air box to the air guide plate, is drawn into the air inlet and flows through an inside of the tubular portion and then flows to the lower air passage through the impeller, and another flow of the air, which is conducted from the inside/outside air box to a region outside of the air guide plate, flows through an outside of the tubular portion and then flows to the upper air passage through the impeller; and in a cross section of a flow passage formed to conduct the flow of the air from the inside/outside air box to the upper air passage while the cross section of the flow passage is taken along an imaginary plane which includes an outer edge of the air guide plate and is parallel to the rotational axis of the impeller, a passage section, which is located on one radial side of the separation tube where the nose is placed, is defined as a first opening section, and another passage section, which is located on an opposite radial side of the separation tube, which is opposite to the nose, is defined as a second opening section, and a passage cross-sectional area of the second opening section is larger than a passage cross-sectional area of the first opening section.

With this configuration, the pressure loss of the air flowing in the second opening section is reduced in comparison to the case where the passage cross-sectional area of the first opening section is the same as the passage cross-sectional area of the second opening section. Specifically, the balance between the pressure loss of the air passing through the first opening section and the pressure loss of the air passing through the second opening section corresponds to the flow amount characteristic of the air drawn into the impeller, and the flow amount of the air conducted in the flow passage located on the rear side of the separation tube is increased. As a result, the flow amount of the air drawn from the flow passage located on the rear side of the separation tube into the impeller is increased, and thereby the blowing efficiency of the blower can be improved. The flow passage on the rear side of the separation tube is a flow passage formed between a top surface of the scroll casing and the bellmouth, which are located on one side of this flow passage, and the air guide plate, which is located on the other side of this flow passage, while the top surface of the scroll casing is located at one end of the scroll casing in the axial direction of the rotational axis of the impeller. Furthermore, the blowing efficiency is a blowing amount of the air blown by the centrifugal blower relative to the electric power supplied to the electric motor that rotates the impeller.

Hereinafter, embodiments of the present disclosure will be described with reference to the drawings. In each of the following embodiments, parts, which are identical or equal to each other, are indicated by the same reference sign, and the explanation thereof is omitted.

First Embodiment

A first embodiment will be described with reference to the drawings. A centrifugal blower 1 of the present embodiment is installed to a two-layer flow air conditioning system of a vehicle. The centrifugal blower 1 is operable to simultaneously suction inside air (hereinafter referred to as inside air) from an inside of a vehicle cabin and outside air (hereinafter referred to as outside air) from an outside of the vehicle cabin while keeping the inside air and the outside air separated from each other.

As shown in FIGS. 1 to 4, the centrifugal blower 1 includes an inside/outside air box 10, a filter 20, an impeller 30, a scroll casing 40, a bellmouth 50, a partition wall 44, and a separation tube 60.

The inside/outside air box 10 is located at a top of the centrifugal blower 1. The inside/outside air box 10 has an outside-air inlet 11, a first inside-air inlet 12, and a second inside-air inlet 13 which are arranged in this order from a vehicle front side. The outside air is introduced into the outside-air inlet 11. The inside air is introduced into the first inside-air inlet 12 and the second inside-air inlet 13. A first switching door 14 and a second switching door 15 are placed at an inside of the inside/outside air box 10. The first switching door 14 is operable to selectively open and close the outside-air inlet 11 and the first inside-air inlet 12. The second switching door 15 is operable to selectively open and close the second inside-air inlet 13. Each of the first switching door 14 and the second switching door 15 is formed as, for example, a rotary door.

The filter 20 is placed at a lower part of the inside/outside air box 10. The filter 20 collects foreign objects contained in the air (i.e., the outside air and the inside air) that is introduced into the inside/outside air box 10. The filter 20 is formed by, for example, a dust-removing filter material that has a predetermined air permeability and is bent into folds. The filter 20 is formed in such a way that the folds are folded in a direction in which the outside-air inlet 11, the first inside-air inlet 12, and the second inside-air inlet 13 are aligned (e.g., a front-to-rear direction of the vehicle). In other words, lines of the folds of the filter 20 extend in a direction (e.g., a vehicle width direction) that is perpendicular to the direction in which the outside-air inlet 11, the first inside-air inlet 12, and the second inside-air inlet 13 are aligned. The inside/outside air box 10 and the filter 20 are respectively shaped in a rectangular form when viewed from above.

The impeller 30 is a centrifugal fan that is rotated by an electric motor 31. The impeller 30 includes a main plate 33, which is fixed to a shaft 32 of the electric motor 31, and a plurality of blades 34, which are fixed to the main plate 33. The impeller 30 suctions the air, which has passed through the filter 20, from one side in an axial direction of a rotational axis of the impeller 30 and discharges the air toward an outer side of the impeller 30 in a radial direction of the impeller 30. A blade partition wall 35 extends between each circumferentially adjacent two of the blades 34 to separate between an air flow, which flows along an axially upper region of the blade 34, and an air flow, which flows along an axially lower region of the blade 34.

The scroll casing 40 surrounds the impeller 30 from a radially outer side of the impeller 30. The scroll casing 40 has a nose 41 formed at a part of an outer periphery of the scroll casing 40. The scroll casing 40 forms an air passage 42 that has a passage cross-sectional area which is progressively increased from the nose 41 toward one side in a circumferential direction of the scroll casing 40. The air passage 42 is formed mainly between an inner wall of the scroll casing 40 and trailing edges 36 of the blades 34 of the impeller 30. A part of the air passage 42, which has a largest passage cross-sectional area in the air passage 42, is communicated with an air conditioning casing (not shown) of the air conditioning system. Therefore, the air, which is discharged from the air passage 42 of the scroll casing 40, is introduced into the air conditioning casing.

Although not shown in the drawings, an evaporator, a heater core, an air mix door and the like for adjusting the temperature and the humidity of the air, are placed at the inside of the air conditioning casing. The conditioning air, the temperature and the humidity of which are adjusted at the inside of the air conditioning casing, is discharged into the vehicle cabin from, for example, face discharge outlets, foot discharge outlets, and defroster discharge outlets.

A bellmouth 50, which is shaped in a form of a ring and forms a suction inlet for introducing the air toward the impeller 30, is formed at an end surface 49 of the scroll casing 40 (hereinafter referred to as a top surface 49 of the scroll casing 40) located at an end of the scroll casing 40 in the axial direction of the rotational axis of the impeller 30. The air, which has passed through the filter 20, is drawn into the impeller 30 through the bellmouth 50.

A mounting frame 43 for mounting the inside/outside air box 10 and the filter 20 is provided at the top surface 49 of the scroll casing 40. Specifically, the inside/outside air box 10 and the filter 20 are installed to the mounting frame 43.

A partition wall 44 is formed at the inside of the scroll casing 40 to partition the air passage 42 into one region, which is located on one side of the partition wall 44 in the axial direction of the impeller 30, and another region, which is located on another side of the partition wall 44 in the axial direction of the impeller 30. The partition wall 44 is located in a position that corresponds to the blade partition walls 35 each of which is formed between the corresponding adjacent two of the blades 34 of the impeller 30. In the following description, a region of the air passage 42 located above the partition wall 44 will be referred to as an upper air passage 45, and another region of the air passage 42 located below the partition wall 44 will be referred to as a lower air passage 46.

The separation tube 60 extends from a region located between the filter 20 and the impeller 30 to a region located on the radially inner side of the impeller 30. The separation tube 60 has an air guide plate 61 and a tubular portion 63. The air guide plate 61 is placed at a part of the region between the impeller 30 and the filter 20. The tubular portion 63 is shaped such that the tubular portion 63 extends from an air inlet 62 of the air guide plate 61 and passes a location on the radially inner side of the impeller 30 and expands radially outward.

Figure 3:
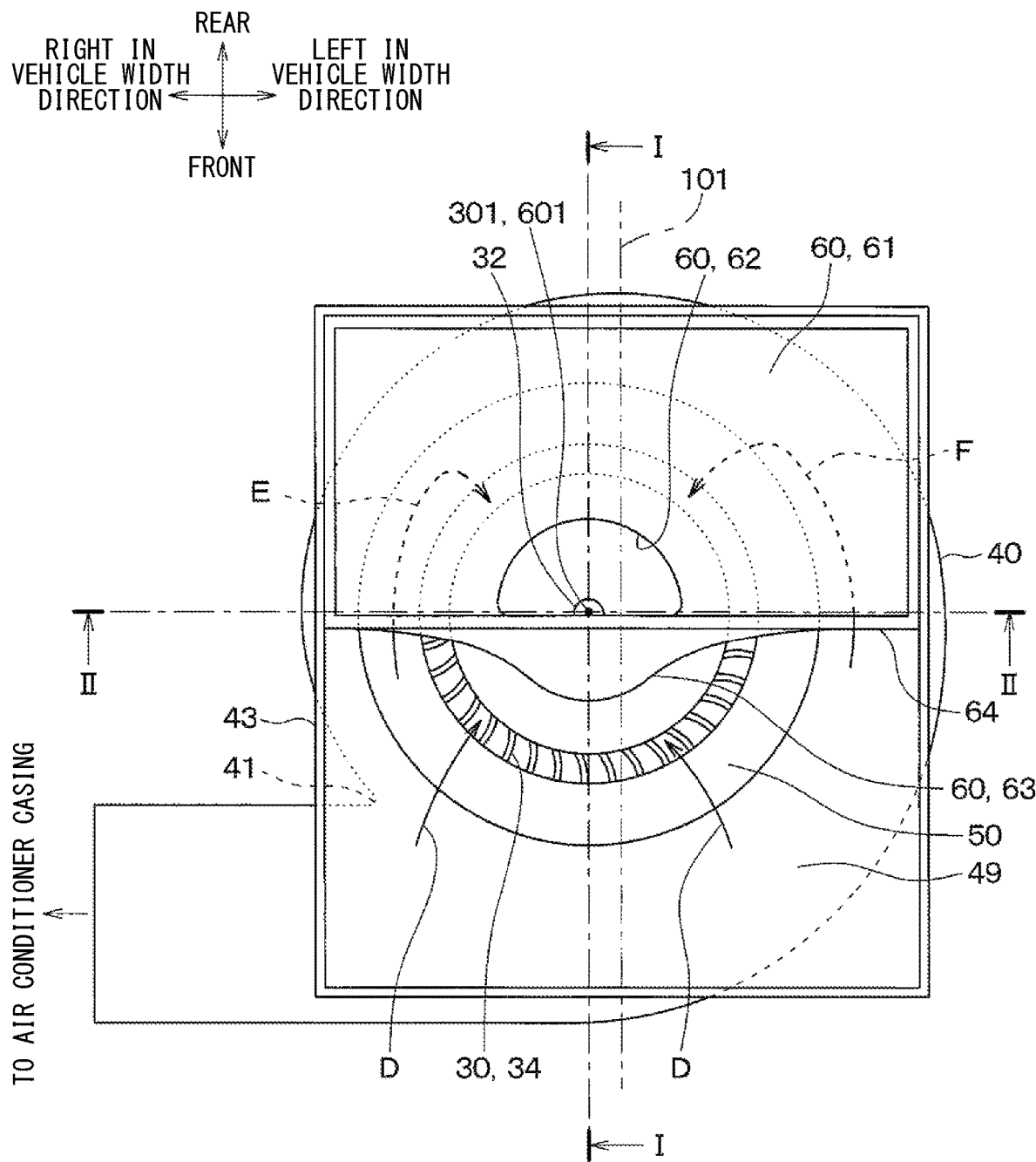
FIG. 3 is a cross-sectional view taken along line III-III in FIGS. 1 and 2.

As shown in FIG. 3, the air guide plate 61 is shaped generally in a rectangular form when viewed from above. The air guide plate 61 covers almost one half of the bellmouth 50. Specifically, as shown in FIG. 1, an outer edge 64 of the air guide plate 61, which is adjacent to a rotational axis 301 of the impeller 30, is placed at a location that corresponds to an end part 16 of the second switching door 15 of the inside/outside air box 10 located adjacent to the filter 20 when the second switching door 15 fully opens the second inside-air inlet 13. The location, which corresponding to the end part 16 of the second switching door 15 adjacent to the filter 20, can be said to be, for example, a location directly below the end part 16 of the second switching door 15.

The air guide plate 61 and the tubular portion 63 are joined together in a form of a funnel. The tubular portion 63 has a tubular form in a region that is on the radially inner side of the impeller 30. An end part 68 of the tubular portion 63, which is opposite to the air guide plate 61, is placed at a location that corresponds to the blade partition walls 35 each of which is formed between the corresponding adjacent two of the blades 34 of the impeller 30. This location, which corresponds to the blade partition walls 35, can be said to be a location that is on the radially inner side of the blade partition walls 35.

With the structure described above, the centrifugal blower 1 can generate a flow of the air such that the air, which has introduced into the inside/outside air box 10 and has passed through a predetermined region of the filter 20, flows from one axial side of the impeller 30 to the lower air passage 46 through the inside of the separation tube 60. The centrifugal blower 1 can also generate another flow of the air such that the air, which has passed through another region of the filter 20, flows from the one axial side of the impeller 30 to the upper air passage 45 through the outside of the separation tube 60. Specifically, this centrifugal blower 1 is a single suction centrifugal blower. Here, it should be noted that the predetermined region of the filter 20 is, for example, a region of the filter 20 that is on the vehicle rear side of a contact location of the filter 20 at which the end part 16 of the second switching door 15 contacts the filter 20. Furthermore, the other region of the filter 20 is, for example, another region of the filter 20 that is on the vehicle front side of the contact location of the filter 20 at which the end part 16 of the second switching door 15 contacts the filter 20.

FIG. 1 shows a state where the first switching door 14 opens the outside-air inlet 11 and closes the first inside-air inlet 12, and the second switching door 15 opens the second inside-air inlet 13. In this state, the centrifugal blower 1 is operable to simultaneously suction the inside air and the outside air while keeping the inside air and the outside air separated from each other.

As indicated by an arrow A in FIG. 1, the inside air introduced from the second inside-air inlet 13 passes through the region of the filter 20 located directly above the air guide plate 61, and then this inside air flows from the air inlet 62 of the air guide plate 61 through the inside of the tubular portion 63 and thereafter flows to the lower air passage 46 through the impeller 30.

In contrast, as indicated by arrows B, C in FIG. 1, the outside air introduced from the outside-air inlet 11 passes through the region of the filter 20 located directly above the air guide plate 61, and then this outside air flows from a space outside the air guide plate 61 through the outside of the tubular portion 63 and thereafter flows to the upper air passage 45 through the impeller 30.

Specifically, as indicated by the arrow B in FIG. 1 and an arrow D in FIG. 3, the flow of the air flowing through the region outside the air guide plate 61 is radially drawn into the impeller 30. Furthermore, as indicated by the arrow C in FIG. 1 and arrows E, F in FIG. 3, the other flow of the air, which flows in the region outside the air guide plate 61, flows from left and right outside spaces of the tubular portion 63 of the separation tube 60 to a flow passage 47 located on a rear side of the separation tube 60 and is then drawn into the impeller 30. The flow passage 47 on the rear side of the separation tube 60 is a passage formed between a top surface 49 of the scroll casing 40 and the bellmouth 50, which are located on one side of this passage, and the air guide plate 61, which is located on the other side of this passage.

Figure 5:
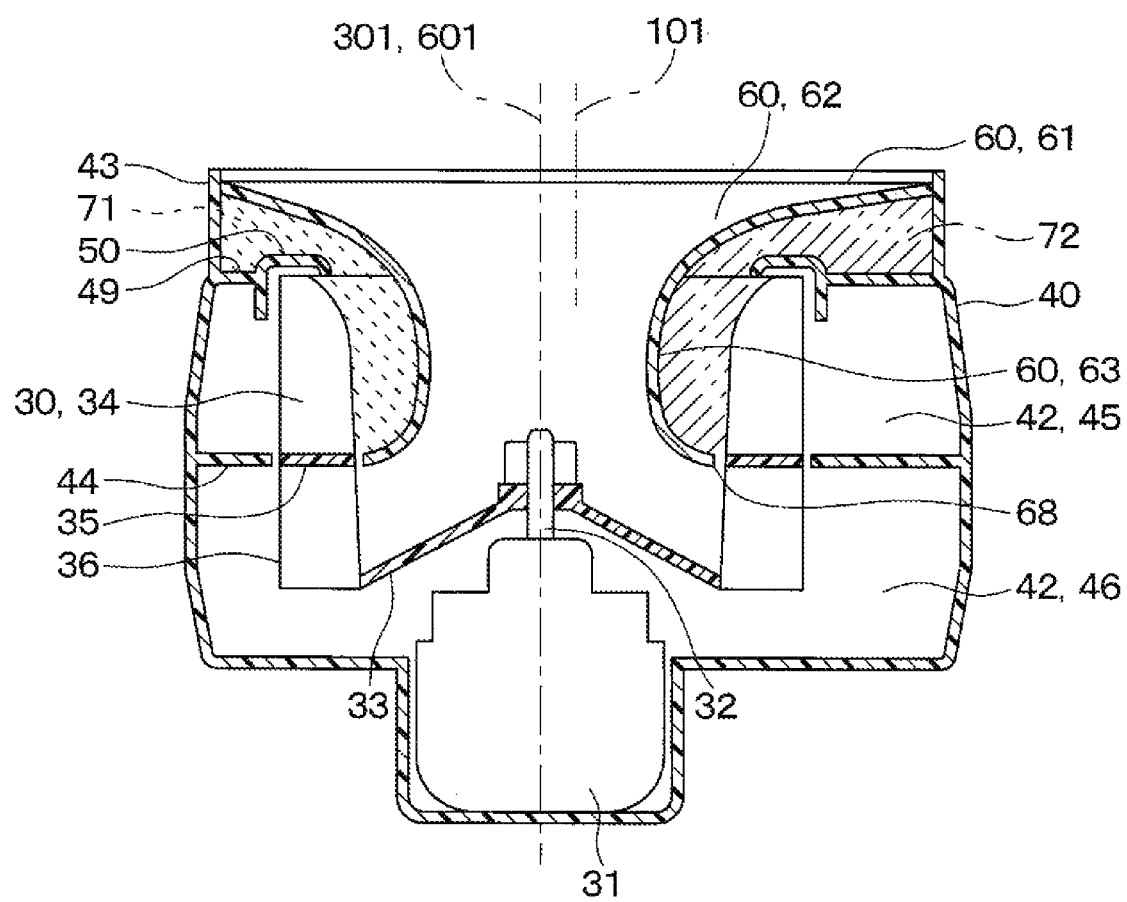
FIG. 5 is an explanatory diagram for explaining a first opening section and a second opening section in the centrifugal blower of the first embodiment.

With reference to FIG. 1, in the present embodiment, there is defined an imaginary plane VS that extends through the flow passage conducting the air from the filter 20 to the upper air passage 45 and includes the outer edge 64 of the air guide plate 61 and is parallel to the rotational axis 301 of the impeller 30. As shown in FIG. 5, in the present embodiment, in a cross section of this flow passage, which is taken along the imaginary plane VS, a passage section, which is located on one radial side of the separation tube 60 where the nose 41 is placed, is defined as a first opening section 71, and another passage section, which is located on an opposite radial side of the separation tube 60, which is opposite to the nose 41, is defined as a second opening section 72.

In FIG. 5, the first opening section 71 is indicated by a hatch pattern that contains dotted lines, and the second opening section 72 is indicated by a hatch pattern that contains dot-dash lines. This is also true for FIGS. 7, 9, 12, 14, 16 and 18, which will be referred to in the second to eighth embodiments described below.

Figure 4:
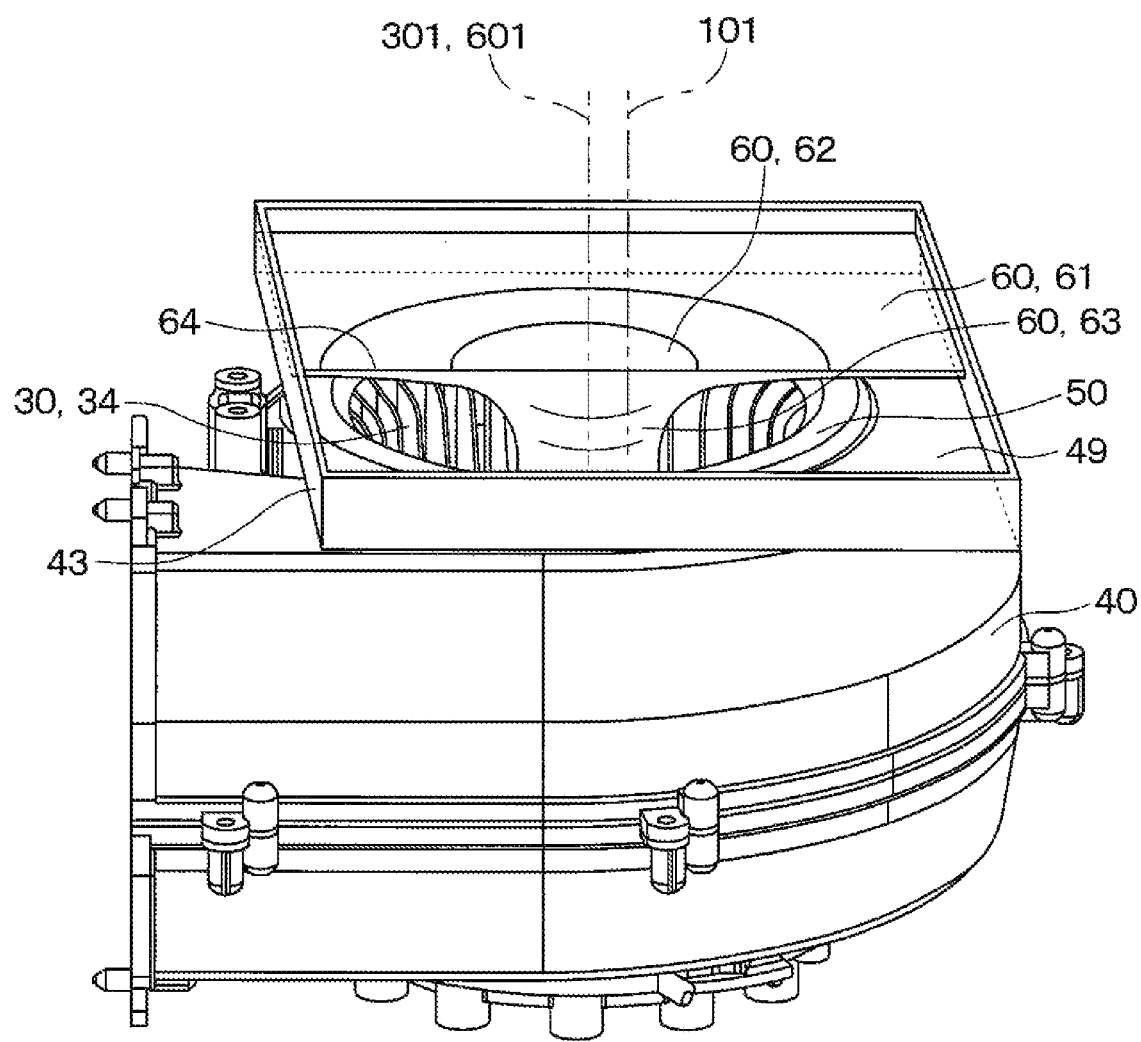
FIG. 4 is a perspective view of the centrifugal blower of the first embodiment, from which an inside/outside air box is removed.

As shown in FIGS. 4 and 5, in the present embodiment, a center 101 of the inside/outside air box 10 is placed at a position that is displaced from the rotational axis 301 of the impeller 30 and a central axis 601 of the tubular portion 63 of the separation tube 60 toward the second opening section 72. Therefore, a passage cross-sectional area of the second opening section 72 is larger than a passage cross-sectional area of the first opening section 71. Specifically, in the present embodiment, a passage cross-sectional area of a portion of the second opening section 72, which is located on the side (the upper axial side in FIG. 5) of the impeller 30 where the air guide plate 61 is placed, is larger than a passage cross-sectional area of a portion of the first opening section 71, which is located on the side (the upper axial side in FIG. 5) of the impeller 30 where the air guide plate 61 is placed.

Next, there will be described a significance of setting the passage cross-sectional area of the second opening section 72 to be larger than the passage cross-sectional area of the first opening section 71 in the centrifugal blower 1 of the present embodiment.

As described above, the air passage 42 formed on the outer side of the impeller 30 in the radial direction is configured such that the passage cross-sectional area of the air passage 42 progressively increases from the nose 41 toward the one side in the circumferential direction. Specifically, a distance measured between the trailing edge 36 of the blade 34 of the impeller 30 and the inner wall of the scroll casing 40 is smallest near the nose 41 and is progressively increased from the nose 41 toward the one side in the circumferential direction. Therefore, a pressure loss of the air flowing from the impeller 30 to the air passage 42 is large near the nose 41 and is progressively reduced from the nose 41 toward the one side in the circumferential direction. As a result, a flow amount of the air drawn into the impeller 30 is small near the nose 41 and is progressively increased from the nose 41 toward the one side in the circumferential direction. Thus, if the passage cross-sectional area of the first opening section 71 is the same as the passage cross-sectional area of the second opening section 72, the flow amount of the air drawn into the impeller 30 through the first opening section 71 will be smaller than the flow amount of the air drawn into the impeller 30 through the second opening section 72. In such a case, the pressure loss of the air passing through the second opening section 72 will be larger than the pressure loss of the air passing through the first opening section 71. As described above, if the balance between the pressure loss of the air passing through the first opening section 71 and the pressure loss of the air passing through the second opening section 72 does not correspond to the flow amount characteristic of the air drawn into the impeller 30, the flow amount of the air conducted in the flow passage 47 located on the rear side of the separation tube 60 will be reduced. As a result, the flow amount of the air drawn from the flow passage 47 located on the rear side of the separation tube 60 into the impeller 30 will be reduced, and thereby a blowing efficiency of the blower may possibly be reduced.

In view of the above point, in the present embodiment, the center 101 of the inside/outside air box 10 is displaced from the rotational axis 301 of the impeller 30 and the central axis 601 of the tubular portion 63 of the separation tube 60 toward the second opening section 72, and the passage cross-sectional area of the second opening section 72 is increased in comparison to the passage cross-sectional area of the first opening section 71. Therefore, the pressure loss of the air flowing in the second opening section 72 is reduced in comparison to the case where the passage cross-sectional area of the first opening section 71 is the same as the passage cross-sectional area of the second opening section 72. Thus, the balance between the pressure loss of the air passing through the first opening section 71 and the pressure loss of the air passing through the second opening section 72 corresponds to the flow amount characteristic of the air drawn into the impeller 30, and the flow amount of the air conducted in the flow passage 47 located on the rear side of the separation tube 60 is increased. As a result, the flow amount of the air drawn from the flow passage 47 located on the rear side of the separation tube 60 into the impeller 30 is increased, and thereby the blowing efficiency of the blower can be improved.

Furthermore, according to the present embodiment, the center 101 of the inside/outside air box 10 is displaced from the rotational axis 301 of the impeller 30 and the central axis 601 of the tubular portion 63 of the separation tube 60 toward the second opening section 72. Therefore, the passage cross-sectional area of the first opening section 71 and the passage cross-sectional area of the second opening section 72 can be adjusted without increasing a size of the centrifugal blower 1 measured in the axial direction of the rotational axis of the impeller 30 (e.g., a size of the centrifugal blower 1 measured in a height direction of the centrifugal blower 1).

Furthermore, according to the present embodiment, the passage cross-sectional area of the first opening section 71 and the passage cross-sectional area of the second opening section 72 can be adjusted without significantly changing the configuration of the inside/outside air box 10 and the configuration of the separation tube 60 from those of the conventional centrifugal blower. The conventional centrifugal blower is one in which the center 101 of the inside/outside air box 10, the rotational axis 301 of the impeller 30, and the central axis 601 of the separation tube 60 coincide with each other.

Furthermore, according to the present embodiment, since the configuration of the inside/outside air box 10 and the configuration of the separation tube 60 are not significantly changed from those of the conventional centrifugal blower, there is no influence on the flow of the air which flows from the inside/outside air box 10 through the inside of the separation tube 60 and then flows into the lower air passage 46.

Second to Eighth Embodiments

Hereinafter, second to eighth embodiments will be described. The second to eighth embodiments are modifications of the first embodiment, in which the configuration of the separation tube 60 or the configuration of the inside/outside air box 10 is changed from that of the first embodiment, and the rest of the centrifugal blower is same as that of the first embodiment. Therefore, in the second to eighth embodiments, only the portions, which are different from the first embodiment, will be described.

Second Embodiment

Figure 6:
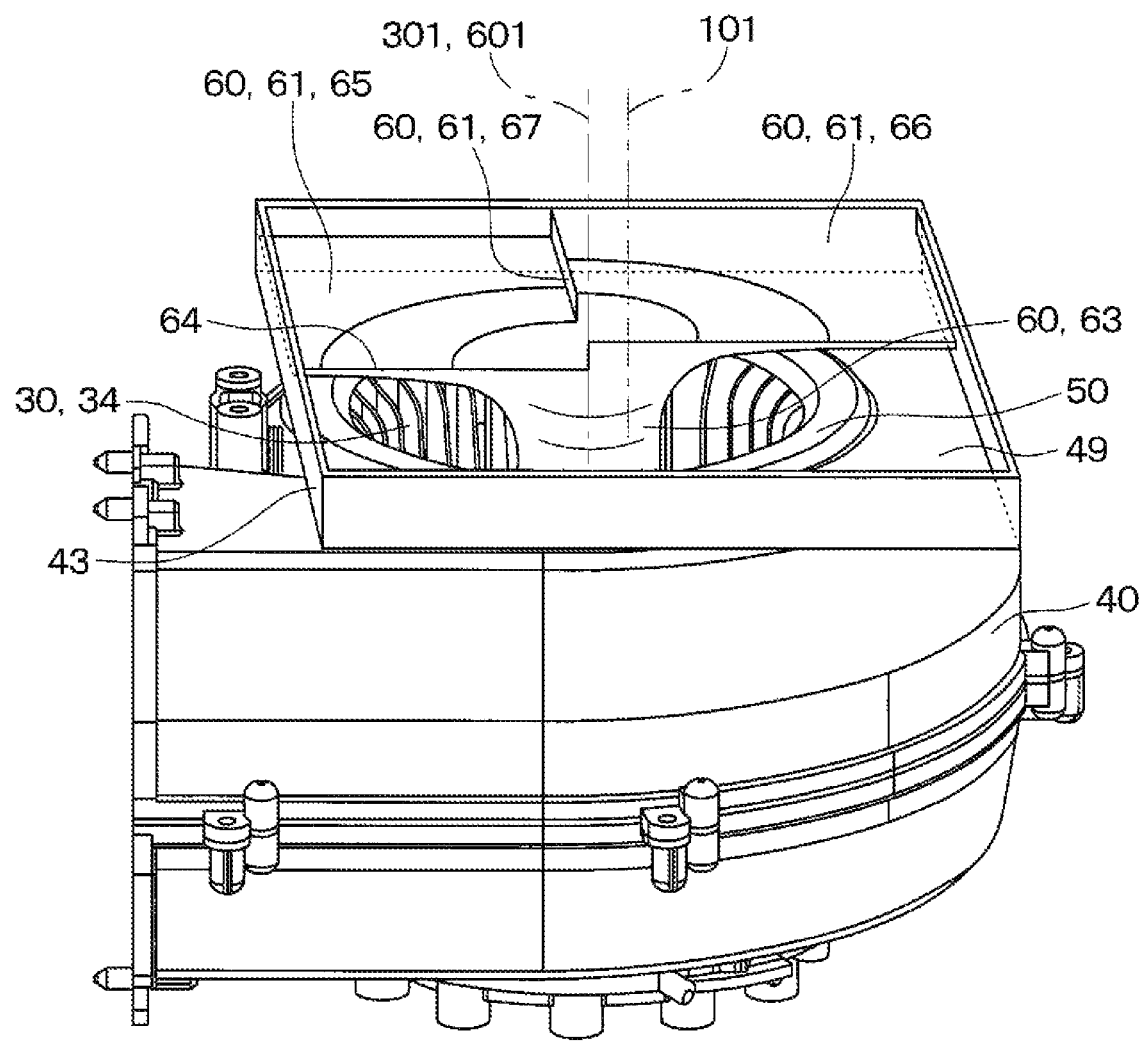
FIG. 6 is a perspective view of a centrifugal blower of a second embodiment, from which an inside/outside air box is removed.
Figure 7:
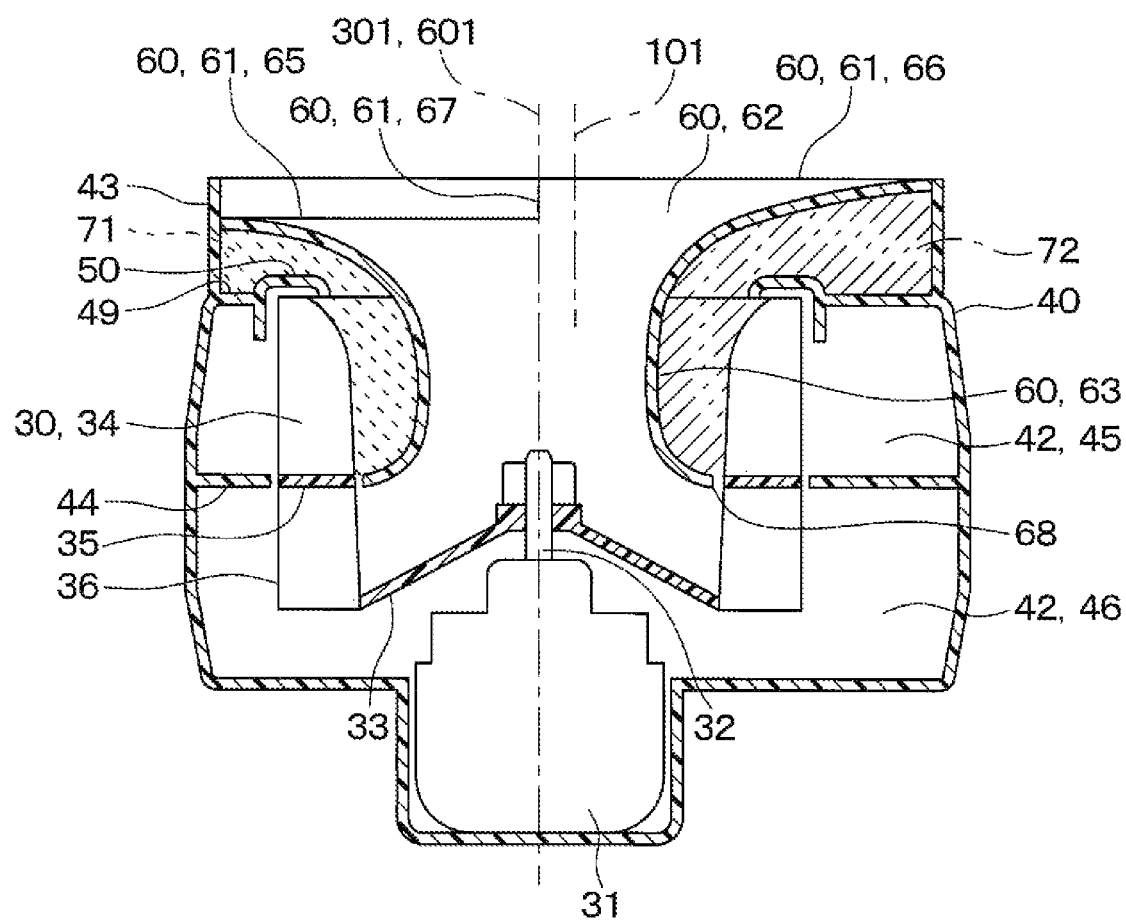
FIG. 7 is an explanatory diagram for explaining a first opening section and a second opening section in the centrifugal blower of the second embodiment.

As shown in FIGS. 6 and 7, in the second embodiment, the air guide plate 61 of the separation tube 60 has: a first surface 65 which is adjacent to the first opening section 71; a second surface 66, which is adjacent to the second opening section 72; and a riser surface (also referred to as a connection surface) 67, which connects between the first surface 65 and the second surface 66 respectively placed at different axial locations. Here, the term "riser surface" is defined as a surface that connects between two surfaces respectively placed at different levels (different axial locations). The second surface 66 is farther from the bellmouth 50 than the first surface 65. In the second embodiment, the center 101 of the inside/outside air box 10 is also displaced from the rotational axis 301 of the impeller 30 and the central axis 601 of the tubular portion 63 of the separation tube 60 toward the second opening section 72.

With the above described configuration, even in the second embodiment, the passage cross-sectional area of the portion of the second opening section 72, which is located on the side of the impeller 30 where the air guide plate 61 is placed, is larger than the passage cross-sectional area of the portion of the first opening section 71, which is located on the side of the impeller 30 where the air guide plate 61 is placed. Therefore, the passage cross-sectional area of the second opening section 72 is larger than the passage cross-sectional area of the first opening section 71. Therefore, the second embodiment can provide the same effects and advantages as those of the first embodiment.

Third Embodiment

Figure 8:
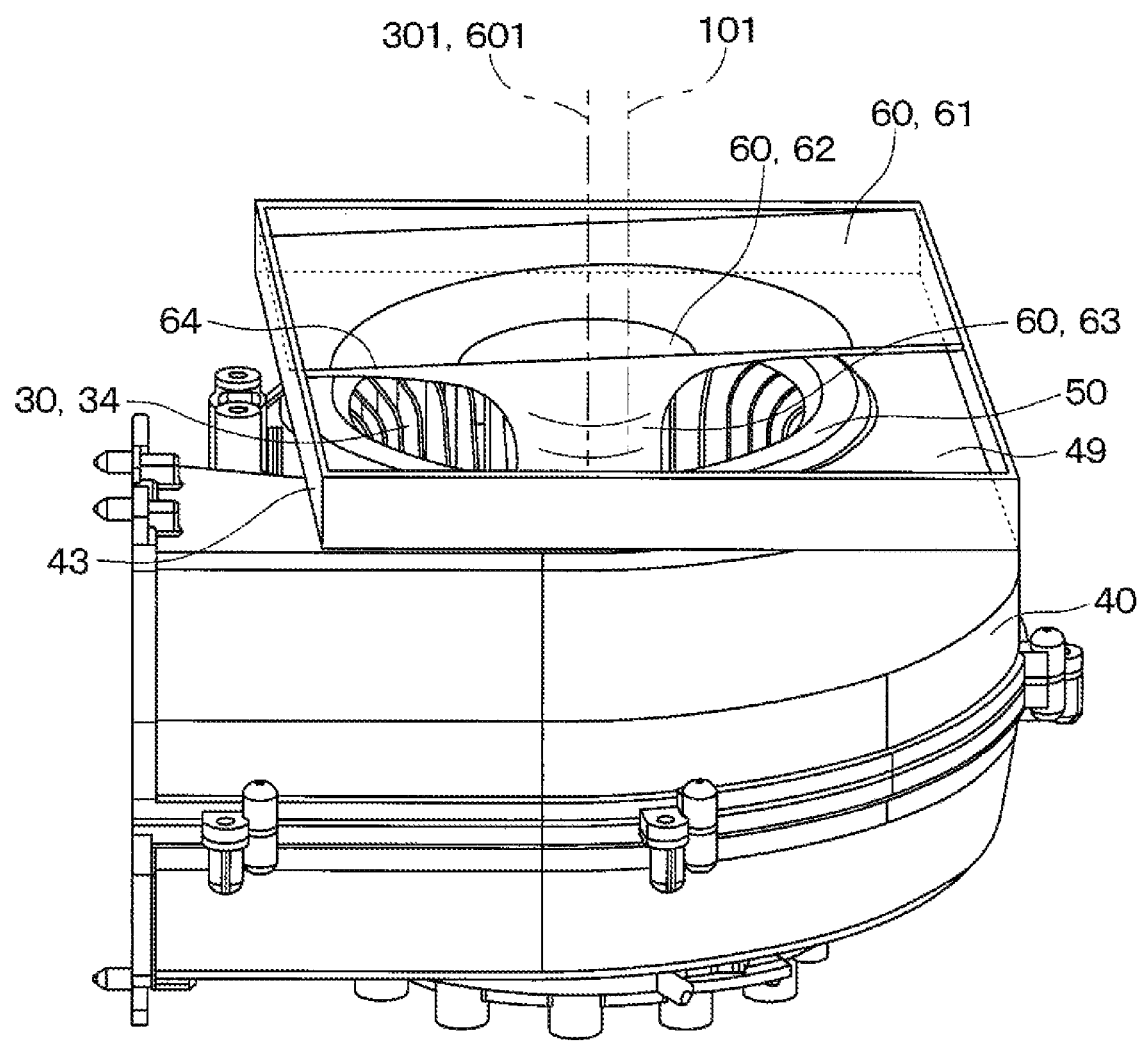
FIG. 8 is a perspective view of a centrifugal blower of a third embodiment, from which an inside/outside air box is removed.
Figure 9:
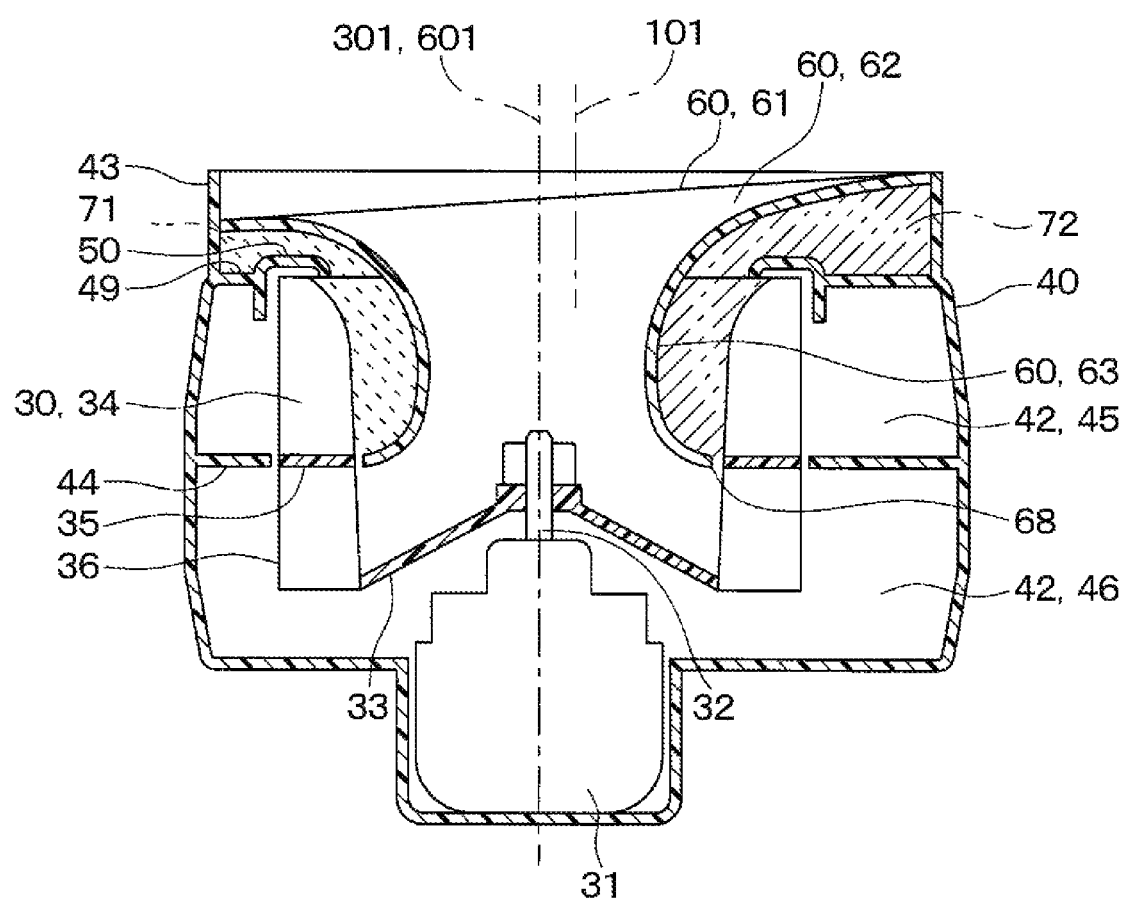
FIG. 9 is an explanatory diagram for explaining a first opening section and a second opening section in the centrifugal blower of the third embodiment.

As shown in FIGS. 8 and 9, in the third embodiment, the air guide plate 61 of the separation tube 60 is tilted relative to the bellmouth 50 such that a portion of the air guide plate 61, which is adjacent to the second opening section 72, is farther from the bellmouth 50 than another portion of the air guide plate 61, which is adjacent to the first opening section 71. Even in the third embodiment, the center 101 of the inside/outside air box 10 is displaced from the rotational axis 301 of the impeller 30 and the central axis 601 of the tubular portion 63 of the separation tube 60 toward the second opening section 72.

With the above described configuration, even in the third embodiment, the passage cross-sectional area of the portion of the second opening section 72, which is located on the side of the impeller 30 where the air guide plate 61 is placed, is larger than the passage cross-sectional area of the portion of the first opening section 71, which is located on the side of the impeller 30 where the air guide plate 61 is placed. Therefore, the passage cross-sectional area of the second opening section 72 is larger than the passage cross-sectional area of the first opening section 71. Thus, the third embodiment can also provide the same effects and advantages as those of the first embodiment.

Fourth Embodiment

Figure 10:
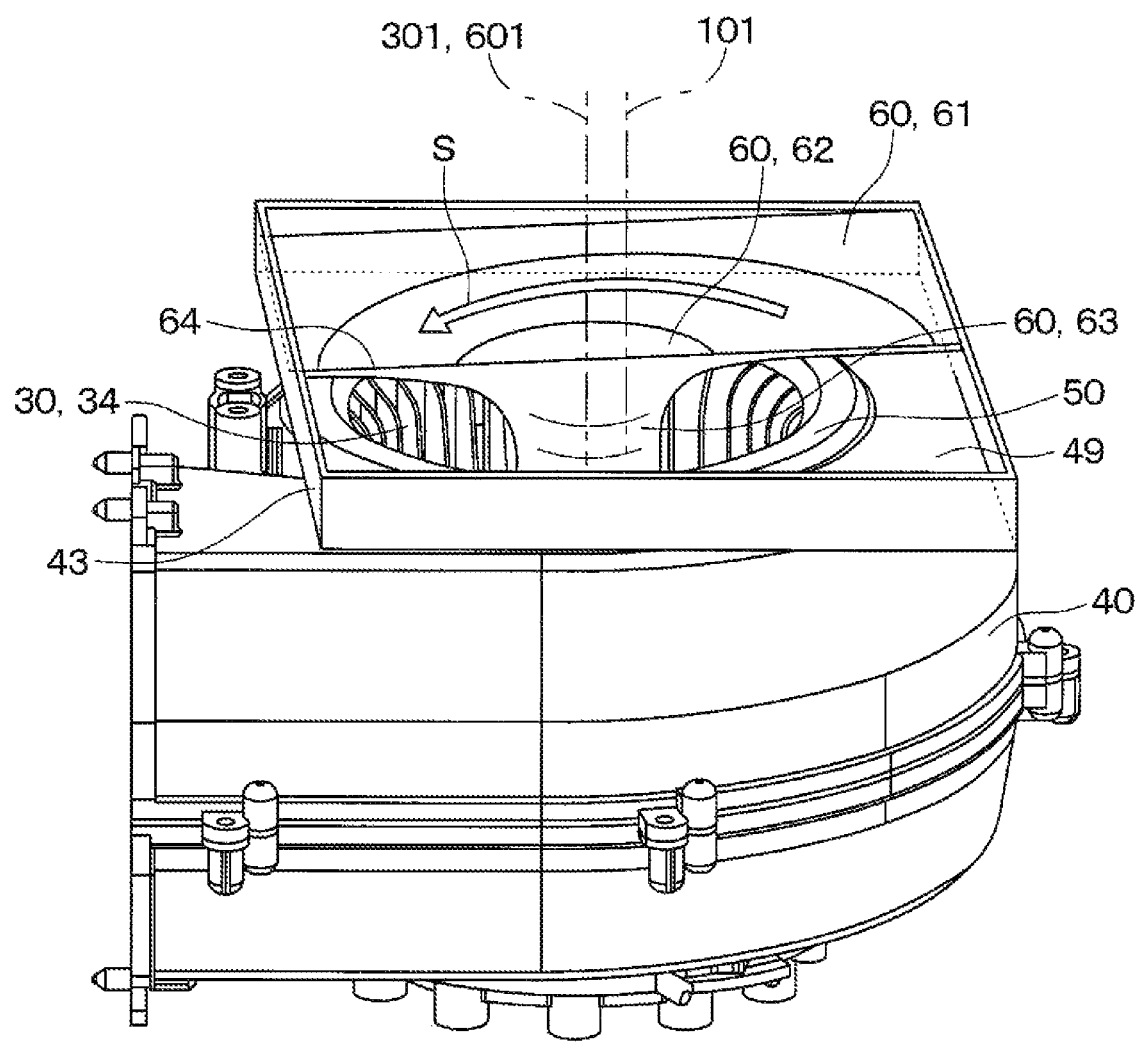
FIG. 10 is a perspective view of a centrifugal blower of a fourth embodiment, from which an inside/outside air box is removed.

As shown in FIG. 10, even in the fourth embodiment, the air guide plate 61 of the separation tube 60 is tilted relative to the bellmouth 50 such that the portion of the air guide plate 61, which is adjacent to the second opening section 72, is farther from the bellmouth 50 than the other portion of the air guide plate 61, which is adjacent to the first opening section 71. Furthermore, in the fourth embodiment, as indicated by an arrow S in FIG. 10, a portion of the air guide plate 61, which is located on a radially outer side of the air inlet 62, is shaped in a form of a slope such that a rate of inclination of the slope relative to the bellmouth 50 is constant in a circumferential direction of the air inlet 62. Even in the fourth embodiment, the center 101 of the inside/outside air box 10 is displaced from the rotational axis 301 of the impeller 30 and the central axis 601 of the tubular portion 63 of the separation tube 60 toward the second opening section 72.

With the above described configuration, even in the fourth embodiment, the passage cross-sectional area of the portion of the second opening section 72, which is located on the side of the impeller 30 where the air guide plate 61 is placed, is larger than the passage cross-sectional area of the portion of the first opening section 71, which is located on the side of the impeller 30 where the air guide plate 61 is placed. Therefore, the passage cross-sectional area of the second opening section 72 is larger than the passage cross-sectional area of the first opening section 71. Thus, the fourth embodiment can also provide the same effects and advantages as those of the first embodiment.

Furthermore, in the fourth embodiment, the portion of the air guide plate 61, which is located on the radially outer side of the air inlet 62, is shaped in the form of the slope discussed above so that the pressure loss of the air flowing circumferentially through the flow passage 47 located on the rear side of the separation tube 60 can be reduced.

Fifth Embodiment

Figure 11:
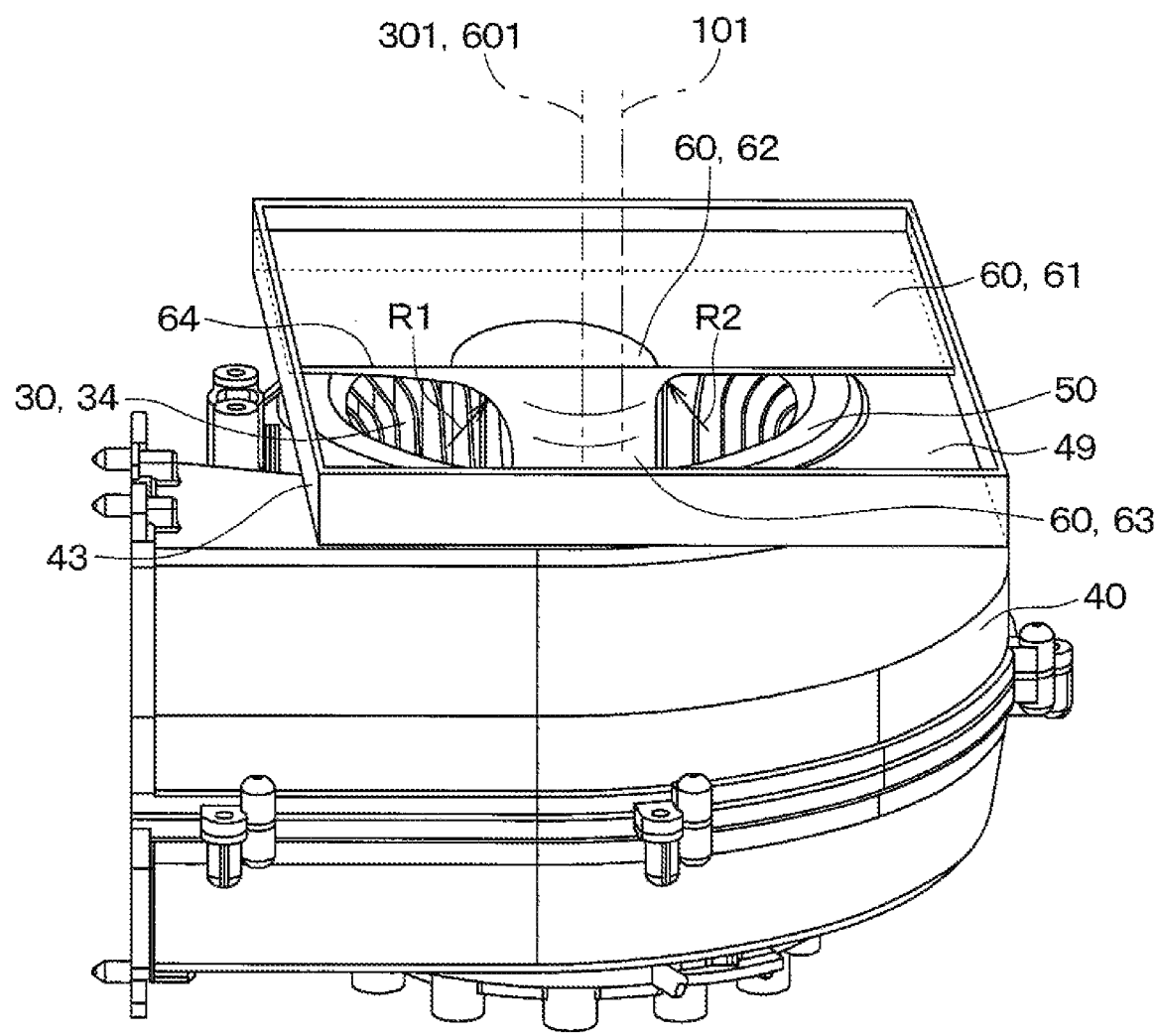
FIG. 11 is a perspective view of a centrifugal blower of a fifth embodiment, from which an inside/outside air box is removed.
Figure 12:
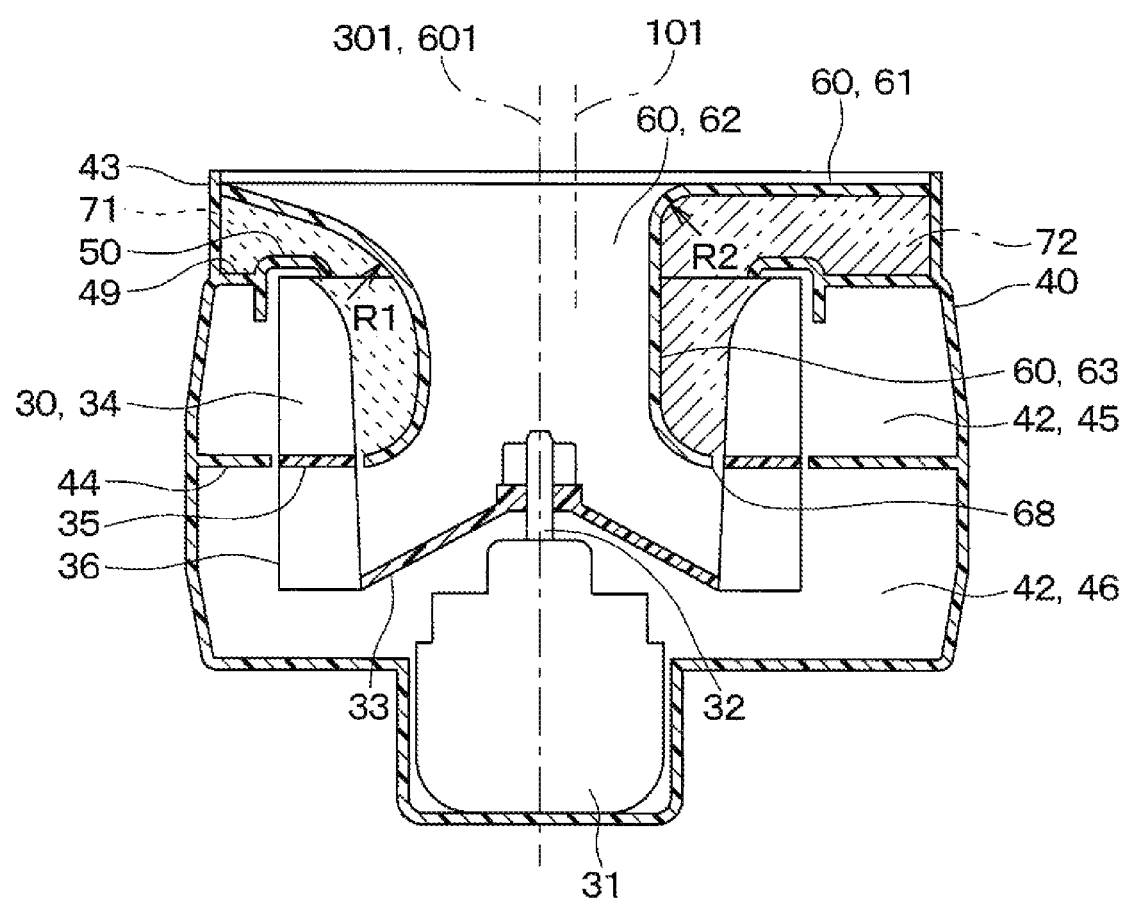
FIG. 12 is an explanatory diagram for explaining a first opening section and a second opening section in the centrifugal blower of the fifth embodiment.

As shown in FIGS. 11 and 12, in the fifth embodiment, a connection between the air guide plate 61 and the tubular portion 63 of the separation tube 60 is configured such that a radius of curvature R2 of a portion of the connection, which is adjacent to the second opening section 72, is smaller than a radius of curvature R1 of another portion of the connection, which is adjacent to the first opening section 71. Even in the fifth embodiment, the center 101 of the inside/outside air box 10 is displaced from the rotational axis 301 of the impeller 30 and the central axis 601 of the tubular portion 63 of the separation tube 60 toward the second opening section 72.

With the above described configuration, even in the fifth embodiment, the passage cross-sectional area of the portion of the second opening section 72, which is located on the side of the impeller 30 where the air guide plate 61 is placed, is larger than the passage cross-sectional area of the portion of the first opening section 71, which is located on the side of the impeller 30 where the air guide plate 61 is placed. Therefore, the passage cross-sectional area of the second opening section 72 is larger than the passage cross-sectional area of the first opening section 71. Thus, the fifth embodiment can also provide the same effects and advantages as those of the first embodiment.

Sixth Embodiment

Figure 13:
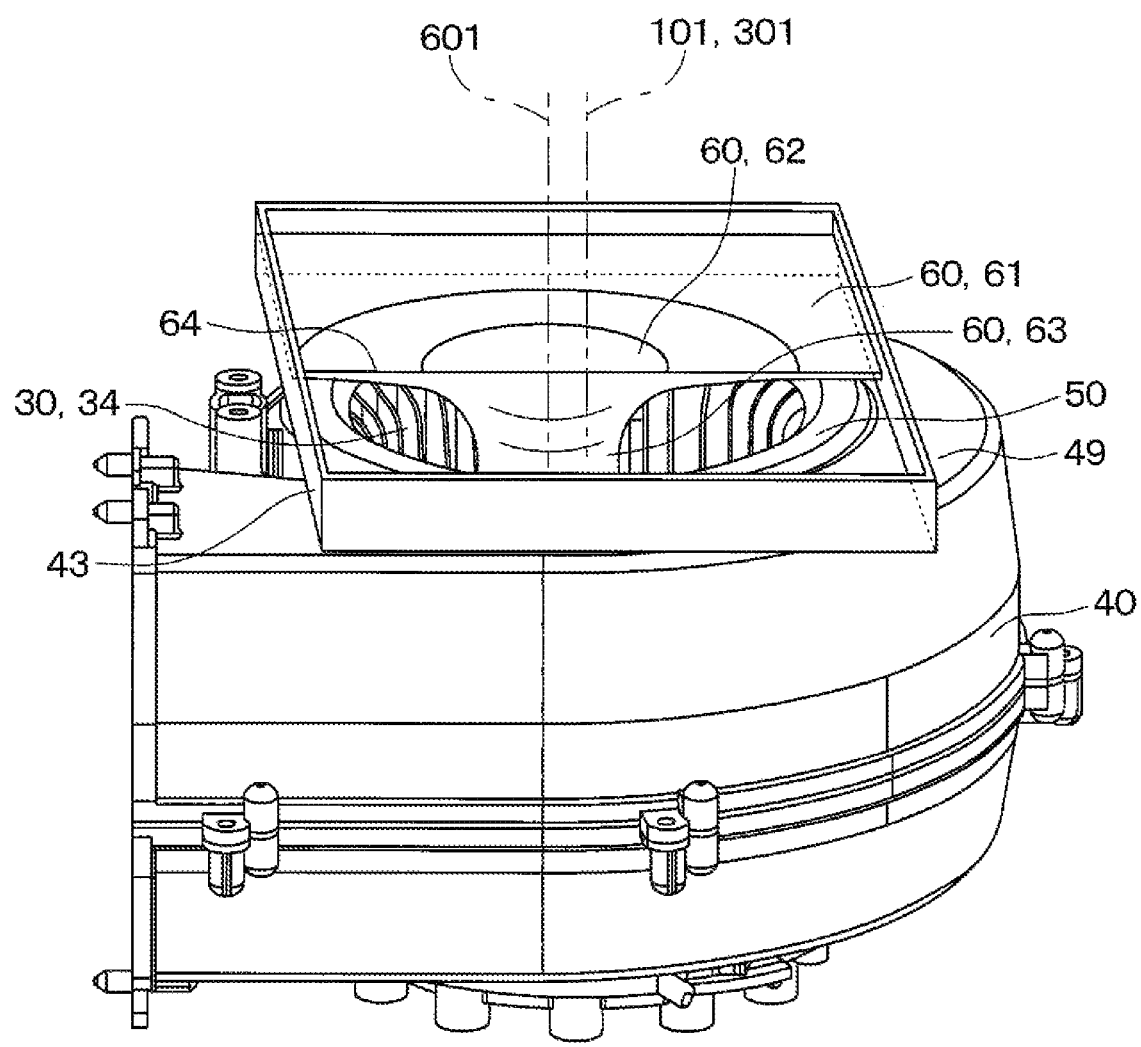
FIG. 13 is a perspective view of a centrifugal blower of a sixth embodiment, from which an inside/outside air box is removed.
Figure 14:
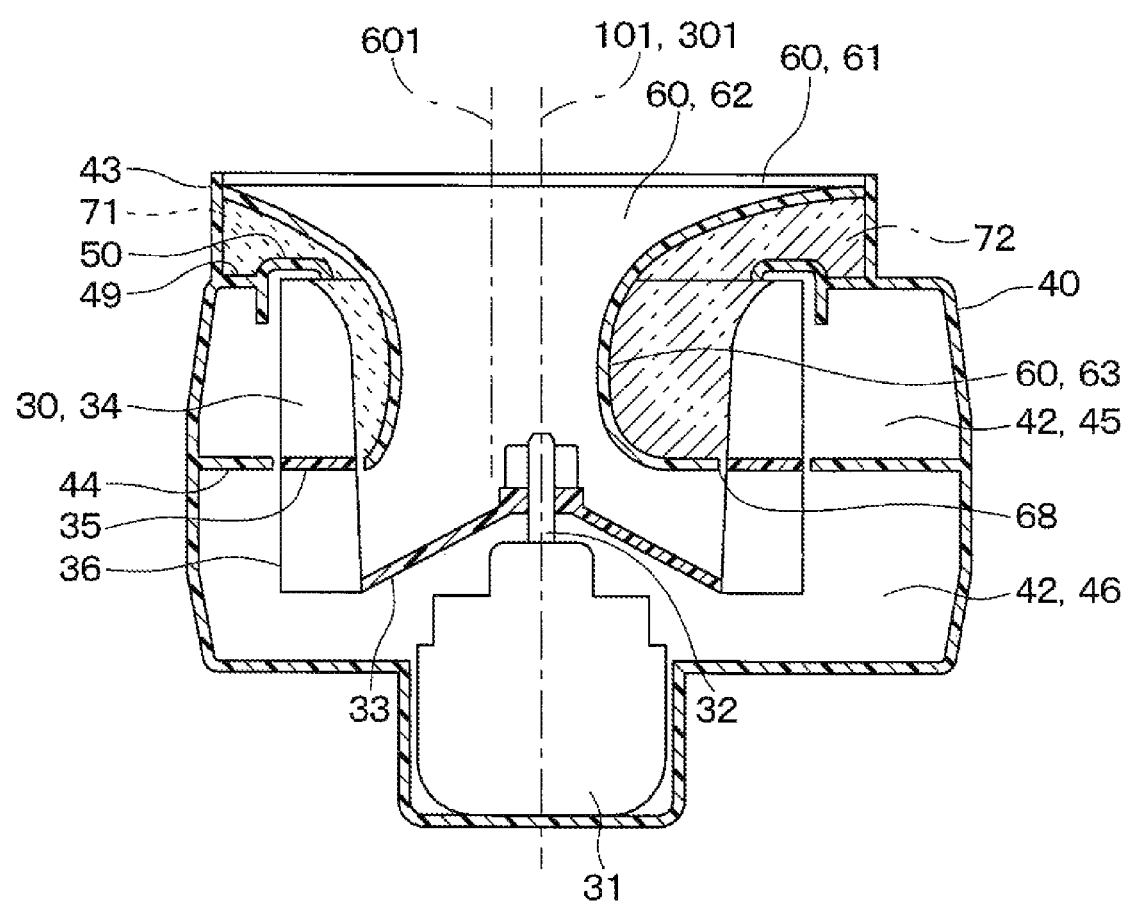
FIG. 14 is an explanatory diagram for explaining a first opening section and a second opening section in the centrifugal blower of the sixth embodiment.

As shown in FIGS. 13 and 14, in the sixth embodiment, the center 101 of the inside/outside air box 10 and the rotational axis 301 of the impeller 30 substantially coincide with each other. Furthermore, in the sixth embodiment, the central axis 601 of the tubular portion 63 of the separation tube 60 is displaced from the rotational axis 301 of the impeller 30 and the center 101 of the inside/outside air box 10 toward the first opening section 71.

With the above-described configuration, even in the sixth embodiment, the passage cross-sectional area of the second opening section 72 is larger than the passage cross-sectional area of the first opening section 71. Specifically, the passage cross-sectional area of the portion of the second opening section 72, which is located on the side of the impeller 30 where the air guide plate 61 is placed, is larger than the passage cross-sectional area of the portion of the first opening section 71, which is located on the side of the impeller 30 where the air guide plate 61 is placed. Furthermore, a passage cross-sectional area of a portion of the second opening section 72, which is located on the radially inner side of the impeller 30, is larger than a passage cross-sectional area of a portion of the first opening section 71, which is located on the radially inner side of the impeller 30. Thus, the sixth embodiment can also provide the same effects and advantages as those of the first embodiment.

Seventh Embodiment

Figure 15:
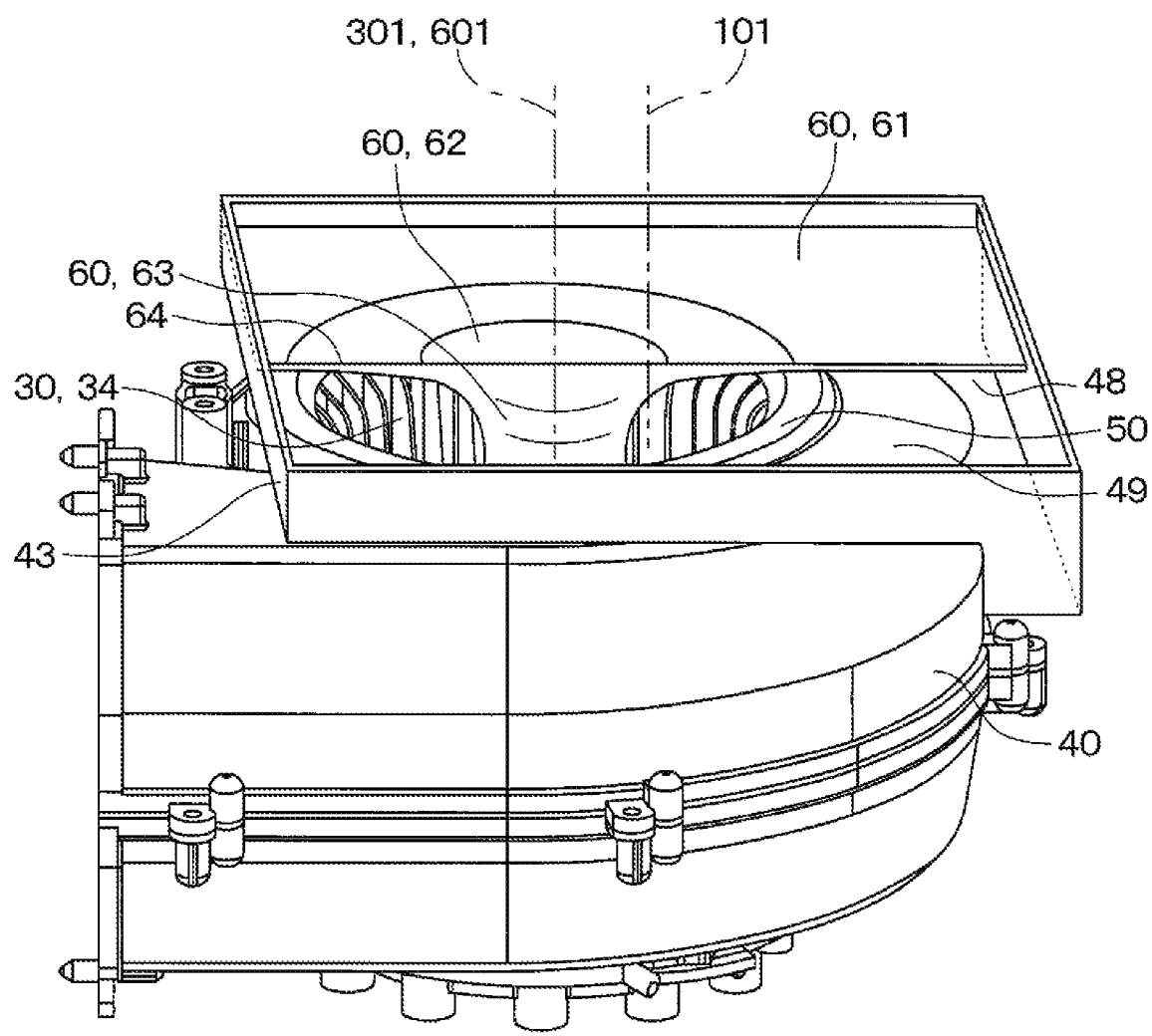
FIG. 15 is a perspective view of a centrifugal blower of a seventh embodiment, from which an inside/outside air box is removed.
Figure 16:
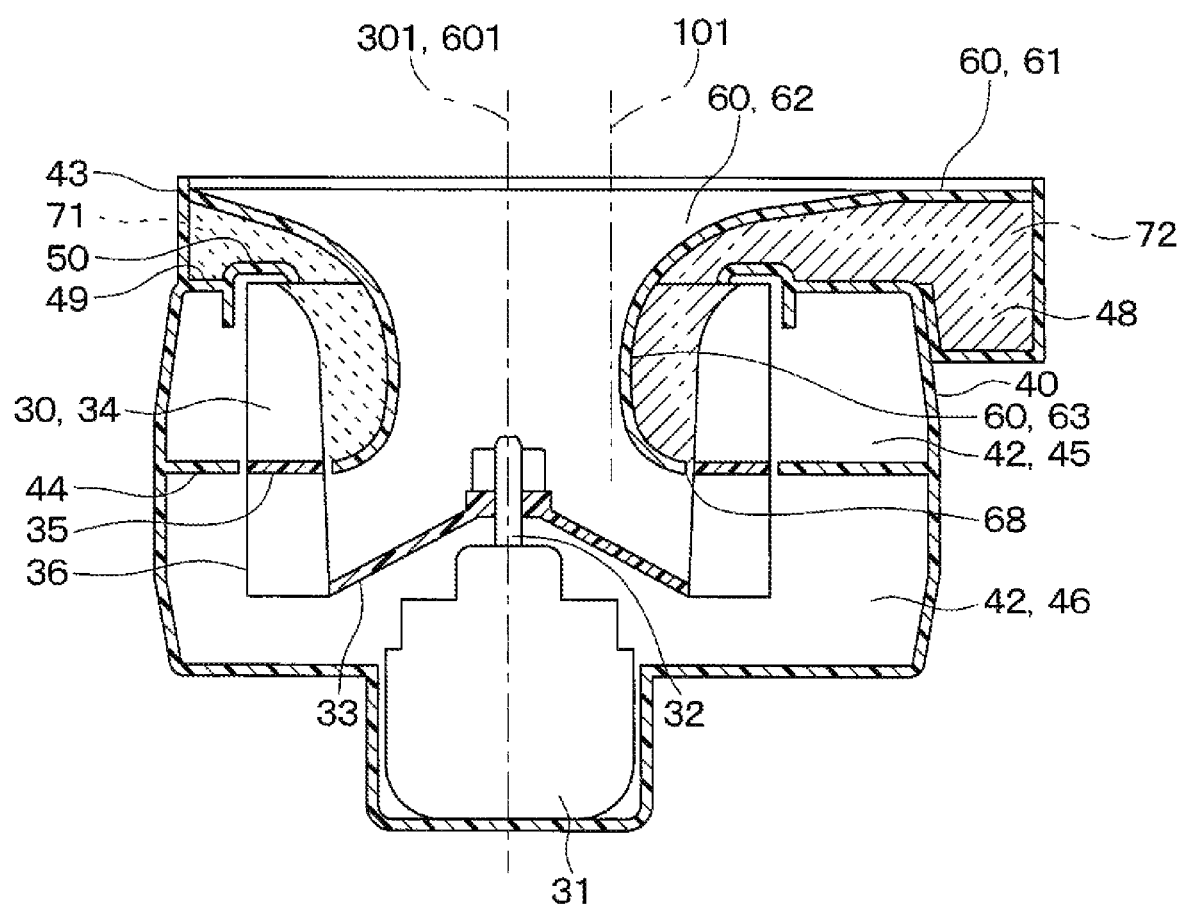
FIG. 16 is an explanatory diagram for explaining a first opening section and a second opening section in the centrifugal blower of the seventh embodiment.

As shown in FIGS. 15 and 16, in the seventh embodiment, a portion of the inside/outside air box 10 and a portion of the air guide plate 61 are located on an outer side of an outer edge of the scroll casing 40. An outer flow passage 48, which is shaped in an arcuate form, is formed in a region that is located on the radially outer side of an outer periphery of the scroll casing 40. At the location that is on the radially outer side of the outer periphery of the scroll casing 40, the outer flow passage 48 is formed to include a region that is located on an opposite side of the top surface 49 of the scroll casing 40 and the bellmouth 50, which is opposite to the air guide plate 61. With this configuration, in the seventh embodiment, a flow of the air, which has passed through the filter 20, flows such that the flow of the air flows from the second opening section 72 through the outer flow passage 48 and is drawn into the impeller 30.

With the above-described configuration, even in the seventh embodiment, the passage cross-sectional area of the second opening section 72 is larger than the passage cross-sectional area of the first opening section 71. Thus, the seventh embodiment can also provide the same effects and advantages as those of the first embodiment.

Eighth Embodiment

Figure 17:
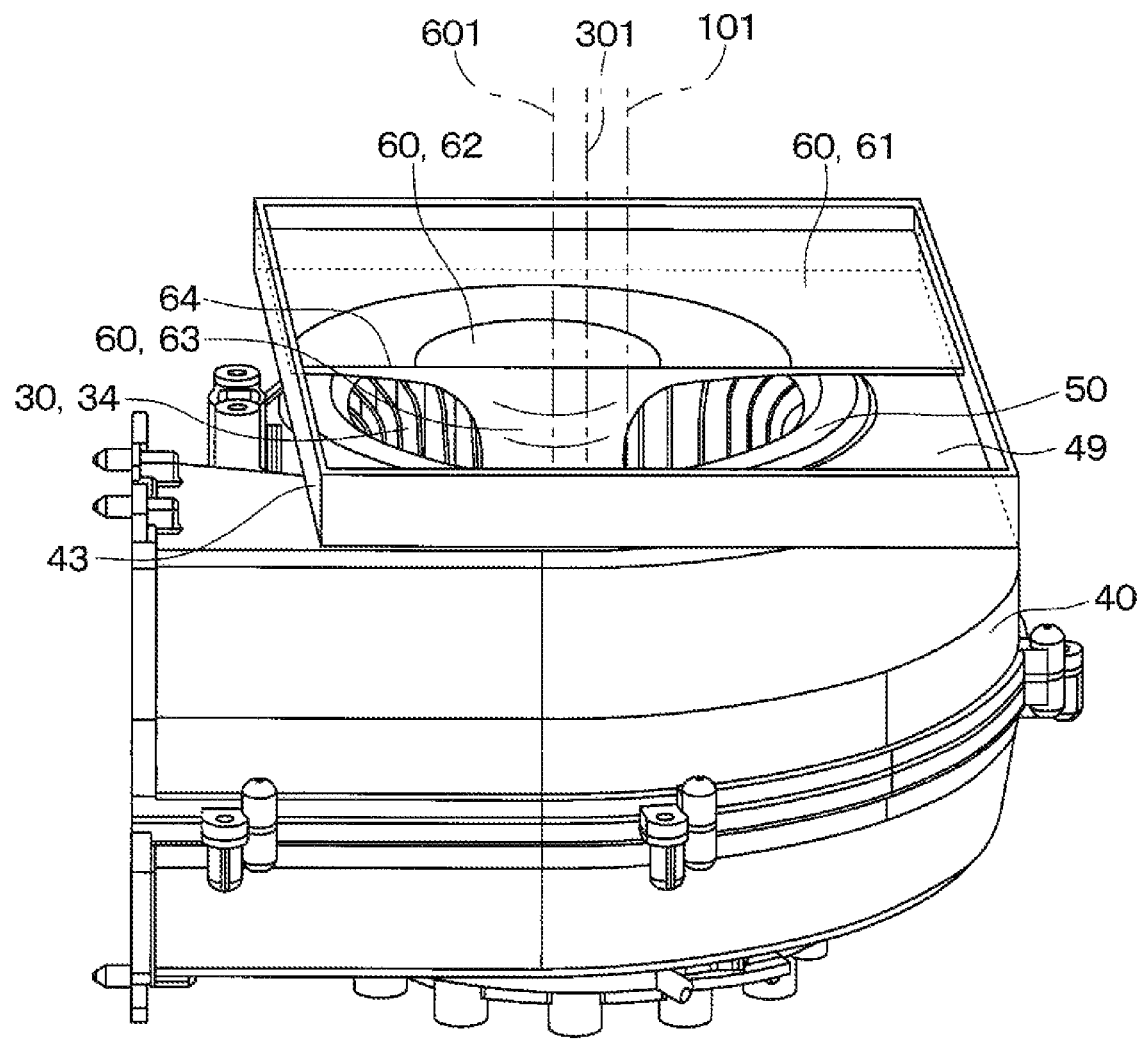
FIG. 17 is a perspective view of a centrifugal blower of an eighth embodiment, from which an inside/outside air box is removed.
Figure 18:
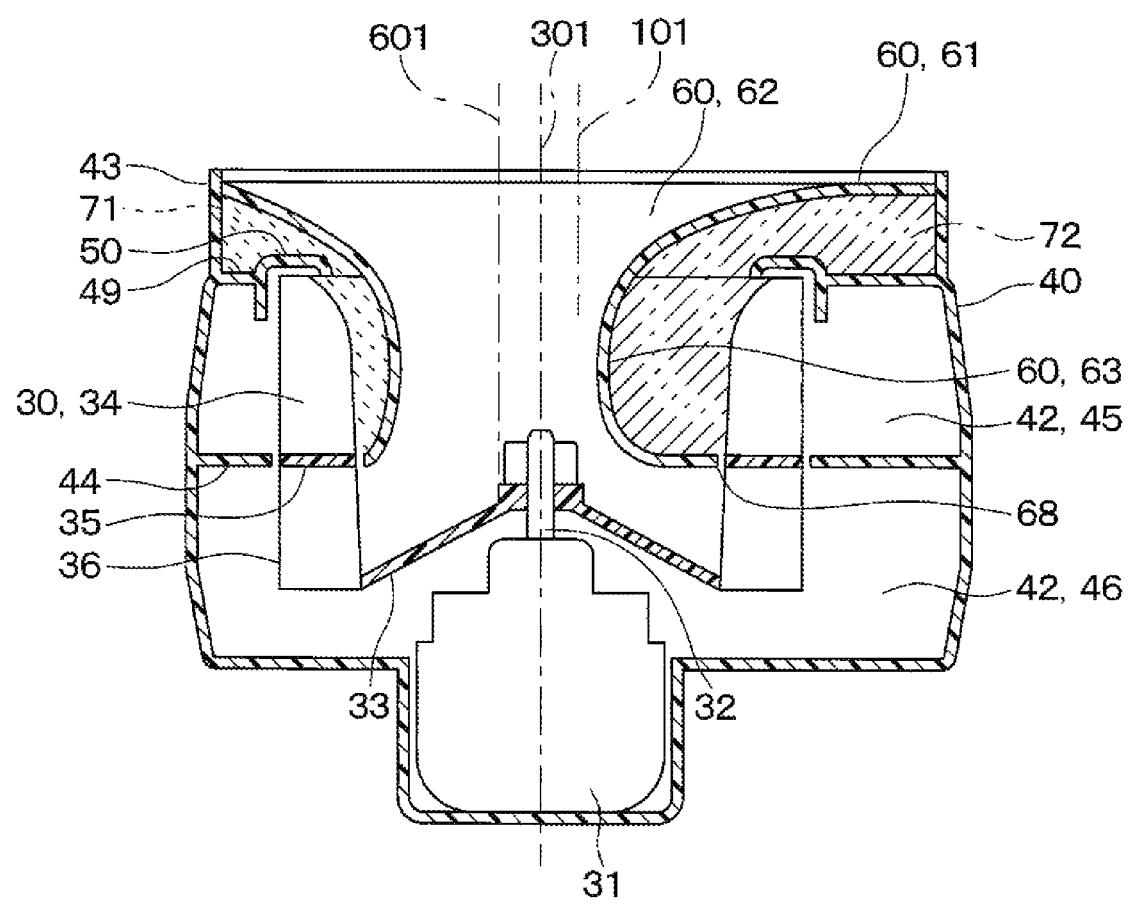
FIG. 18 is an explanatory diagram for explaining a first opening section and a second opening section in the centrifugal blower of the eighth embodiment.

As shown in FIGS. 17 and 18, in the eighth embodiment, the center 101 of the inside/outside air box 10 is displaced from the rotational axis 301 of the impeller 30 toward the second opening section 72. Furthermore, in the eighth embodiment, the central axis 601 of the tubular portion 63 of the separation tube 60 is displaced from the rotational axis 301 of the impeller 30 toward the first opening section 71.

With the above-described configuration, even in the eighth embodiment, the passage cross-sectional area of the second opening section 72 is larger than the passage cross-sectional area of the first opening section 71. Specifically, the passage cross-sectional area of the portion of the second opening section 72, which is located on the side of the impeller 30 where the air guide plate 61 is placed, is larger than the passage cross-sectional area of the portion of the first opening section 71, which is located on the side of the impeller 30 where the air guide plate 61 is placed. Furthermore, the passage cross-sectional area of the portion of the second opening section 72, which is located on the radially inner side of the impeller 30, is larger than the passage cross-sectional area of the portion of the first opening section 71, which is located on the radially inner side of the impeller 30. Thus, the eighth embodiment can also provide the same effects and advantages as those of the first embodiment.

Other Embodiments

The present disclosure should not be limited to the embodiments described above and may be appropriately modified. Further, the above embodiments are not unrelated to each other and can be appropriately combined unless such a combination is obviously impossible. In each of the above embodiments, it is needless to say that the constituent components of the embodiment are not necessarily essential, unless otherwise clearly indicated as essential or in principle considered to be clearly essential. In each of the above embodiments, when a numerical value such as the number, numerical value, amount, range or the like of the constituent components of the exemplary embodiment is mentioned, the present disclosure should not be limited to such a numerical value unless it is clearly stated that it is essential and/or it is required in principle. In each of the above embodiments, when referring to the shape, the positional relationship or the like of the constituent components, the present disclosure should not be limited to such a shape, positional relationship or the like unless it is clearly stated that it is essential and/or it is required in principle. In other words, the terms "up," "down," "left," "right," "vehicle front side," and "vehicle rear side" are used for convenience in the description of each of the above embodiments, and do not limit an installation direction(s) of the blower in the vehicle or the like.

For instance, in the description of the first embodiment, the outside air flows in the upper air passage 45, and the inside air flows in the lower air passage 46. However, the present disclosure should not be limited to this configuration. By adjusting the positions of the first switching door 14 and the second switching door 15 of the inside/outside air box 10, the centrifugal blower 1 can be made to allow only the outside air or only the inside air to flow through both the upper air passage 45 and the lower air passage 46, or allow a mixture of the inside air and the outside air to flow through both the upper air passage 45 and the lower air passage 46.

Furthermore, for instance, in the description of the first embodiment, the nose 41 and the air conditioning casing are arranged at the right side of the scroll casing 40 in the vehicle width direction. However, the present disclosure should not be limited this configuration. The centrifugal blower 1 may be configured such that the nose 41 and the air conditioning casing are arranged at the left side of the scroll casing 40 in the vehicle width direction.

Furthermore, in the description of the first embodiment, the inside/outside air box 10 has the outside-air inlet 11, the first inside-air inlet 12, and the second inside-air inlet 13 arranged in this order from the vehicle front side. Alternatively, the inside/outside air box 10 may have the outside-air inlet 11, the first inside-air inlet 12, and the second inside-air inlet 13 arranged in this order in the vehicle width direction or arranged in this order from the vehicle rear side, or arranged in this order in a diagonal direction of the vehicle.

SUMMARY

According to a first aspect recited in one or more or all of the embodiments described above, a single suction centrifugal blower, which is configured to be installed to a two-layer flow air conditioning system, is operable to simultaneously suction inside air from an inside of a vehicle cabin and outside air from an outside of the vehicle cabin while keeping the inside air and the outside air separated from each other. The centrifugal blower includes an inside/outside air box, an impeller, a scroll casing, a bellmouth, a partition wall, and a separation tube. The inside/outside air box has an outside-air inlet, into which the outside air from the outside of the vehicle cabin is introduced, and an inside-air inlet, into which the inside air from the inside of the vehicle cabin is introduced. The impeller is configured to be rotated by an electric motor such that the impeller suctions air introduced into the inside/outside air box from one side of the impeller in an axial direction of a rotational axis of the impeller and discharges the air toward an outer side of the impeller in a radial direction of the impeller. The scroll casing surrounds the impeller from a radially outer side of the impeller. The scroll casing forms an air passage having a passage cross-sectional area that is progressively increased from a nose, which is formed at a portion of an outer periphery of the scroll casing, toward one side in a circumferential direction of the scroll casing. The bellmouth forms a suction inlet through which the air is drawn toward the impeller. The bellmouth is shaped in a form of a ring and is formed at an end surface of the scroll casing located at an end of the scroll casing in the axial direction of the impeller. The partition wall partitions the air passage, which is located on an outer side of the impeller in the radial direction, into an upper air passage, which is located on one side of the partition wall in the axial direction of the impeller, and a lower air passage, which is located on another side of the partition wall in the axial direction of the impeller. The separation tube has: an air guide plate which is located in a part of a region on a side of the impeller where the inside/outside air box is placed; and a tubular portion which extends from an air inlet of the air guide plate through a location on a radially inner side of the impeller and expands outward in the radial direction. The centrifugal blower is configured such that a flow of the air, which is conducted from the inside/outside air box to the air guide plate, is drawn into the air inlet and flows through an inside of the tubular portion and then flows to the lower air passage through the impeller, and another flow of the air, which is conducted from the inside/outside air box to a region outside the air guide plate, flows through an outside of the tubular portion and then flows to the upper air passage through the impeller. In a cross section of a flow passage formed to conduct the flow of the air from the inside/outside air box to the upper air passage while the cross section of the flow passage is taken along an imaginary plane which includes an outer edge of the air guide plate and is parallel to the rotational axis of the impeller, a passage section, which is located on one radial side of the separation tube where the nose is placed, is defined as a first opening section, and another passage section, which is located on an opposite radial side of the separation tube, which is opposite to the nose, is defined as a second opening section. A passage cross-sectional area of the second opening section is larger than a passage cross-sectional area of the first opening section.

According to a second aspect, a center of the inside/outside air box is placed at a location that is displaced from the rotational axis of the impeller and a central axis of the tubular portion of the separation tube toward the second opening section. With this configuration, a passage cross-sectional area of a portion of the second opening section, which is located on a side of the impeller where the air guide plate is placed, can be made larger than a passage cross-sectional area of a portion of the first opening section, which is located on the side of the impeller where the air guide plate is placed.

Therefore, the passage cross-sectional area of the first opening section and the passage cross-sectional area of the second opening section can be adjusted without increasing a size of the centrifugal blower measured in the axial direction of the rotational axis of the impeller (e.g., a size of the centrifugal blower measured in a height direction of the centrifugal blower).

According to a third aspect, the air guide plate has: a first surface which is adjacent to the first opening section; a second surface which is adjacent to the second opening section and is farther from the bellmouth than the first surface; and a connection surface which connects between the first surface and the second surface respectively placed at different axial locations. With this configuration, the passage cross-sectional area of the portion of the second opening section, which is located on the side of the impeller where the air guide plate is placed, can be made larger than the passage cross-sectional area of the portion of the first opening section, which is located on the side of the impeller where the air guide plate is placed.

According to a fourth aspect, the air guide plate is tilted relative to the bellmouth such that a portion of the air guide plate, which is adjacent to the second opening section, is farther from the bellmouth than another portion of the air guide plate, which is adjacent to the first opening section. With this configuration, the passage cross-sectional area of the portion of the second opening section, which is located on the side of the impeller where the air guide plate is placed, can be made larger than the passage cross-sectional area of the portion of the first opening section, which is located on the side of the impeller where the air guide plate is placed.

According to a fifth aspect, a portion of the air guide plate, which is located on a radially outer side of the air inlet, is shaped in a form of a slope such that a rate of inclination of the slope relative to the bellmouth is constant in a circumferential direction of the air inlet. With this configuration, a pressure loss of the air flowing circumferentially through the flow passage located on the rear side of the separation tube can be reduced.

According to a sixth aspect, a connection between the air guide plate and the tubular portion is configured such that a radius of curvature of a portion of the connection, which is adjacent to the second opening section, is smaller than a radius of curvature of another portion of the connection, which is adjacent to the first opening section. With this configuration, the passage cross-sectional area of the portion of the second opening section, which is located on the side of the impeller where the air guide plate is placed, can be made larger than the passage cross-sectional area of the portion of the first opening section, which is located on the side of the impeller where the air guide plate is placed.

According to a seventh aspect, a central axis of the tubular portion of the separation tube is placed at a position that is displaced from the rotational axis of the impeller and a center of the inside/outside air box toward the first opening section. With this configuration, the passage cross-sectional area of the second opening section can be made larger than the passage cross-sectional area of the first opening section.

Therefore, the passage cross-sectional area of the first opening section and the passage cross-sectional area of the second opening section can be adjusted without increasing the size of the centrifugal blower measured in the axial direction of the rotational axis of the impeller (e.g., the size measured in the height direction) and the size of centrifugal blower measured in a direction perpendicular to the rotational axis of the impeller (e.g., a size of the centrifugal blower measured in the width direction).

According to an eighth aspect, a center of the inside/outside air box is placed at a location that is displaced from the rotational axis of the impeller toward the second opening section, and a central axis of the tubular portion of the separation tube is placed at a location that is displaced from the rotational axis of the impeller toward the first opening section. With this configuration, the passage cross-sectional area of the second opening section can be made larger than the passage cross-sectional area of the first opening section.

According to a ninth aspect, an outer edge of the inside/outside air box and another outer edge of the air guide plate are located on an outer side of an outer edge of the scroll casing. An outer flow passage is formed such that the outer flow passage has a region, which is located on an outer side of the outer periphery of the scroll casing in the radial direction and is located on an opposite side of the bellmouth that is opposite to the air guide plate. A portion of the air introduced from the inside/outside air box is drawn from the second opening section into the impeller through the outer flow passage. With this configuration, the passage cross-sectional area of the second opening section can be made larger than the passage cross-sectional area of the first opening section.

What is claimed is:

1. A single suction centrifugal blower that is configured to be installed to a two-layer flow air conditioning system and is operable to simultaneously suction inside air from an inside of a vehicle cabin and outside air from an outside of the vehicle cabin while keeping the inside air and the outside air separated from each other, the centrifugal blower comprising:
an inside/outside air box that has an outside-air inlet, into which the outside air from the outside of the vehicle cabin is introduced, and an inside-air inlet, into which the inside air from the inside of the vehicle cabin is introduced;
an impeller that is configured to be rotated by an electric motor such that the impeller suctions air introduced into the inside/outside air box from one side of the impeller in an axial direction of a rotational axis of the impeller and discharges the air toward an outer side of the impeller in a radial direction of the impeller;
a scroll casing that surrounds the impeller from a radially outer side of the impeller, wherein the scroll casing forms an air passage having a passage cross-sectional area that is progressively increased from a nose, which is formed at a portion of an outer periphery of the scroll casing, toward one side in a circumferential direction of the scroll casing;
a bellmouth that is shaped in a form of a ring and is formed at an end surface of the scroll casing located at an end of the scroll casing in the axial direction of the impeller, wherein the bellmouth forms a suction inlet through which the air is drawn toward the impeller;
a partition wall that partitions the air passage, which is located on an outer side of the impeller in the radial direction, into an upper air passage, which is located on one side of the partition wall in the axial direction of the impeller, and a lower air passage, which is located on another side of the partition wall in the axial direction of the impeller; and
a separation tube that has:
an air guide plate which is located in a part of a region on a side of the impeller where the inside/outside air box is placed; and
a tubular portion which extends from an air inlet of the air guide plate through a location on a radially inner side of the impeller and expands outward in the radial direction, wherein:
a flow of the air, which is conducted from the inside/outside air box to the air guide plate, is drawn into the air inlet and flows through an inside of the tubular portion and then flows to the lower air passage through the impeller, and another flow of the air, which is conducted from the inside/outside air box to a region outside of the air guide plate, flows through an outside of the tubular portion and then flows to the upper air passage through the impeller;
in a cross section of a flow passage formed to conduct the flow of the air from the inside/outside air box to the upper air passage while the cross section of the flow passage is taken along an imaginary plane which includes an outer edge of the air guide plate and is parallel to the rotational axis of the impeller, a passage section, which is located on one radial side of the separation tube where the nose is placed, is defined as a first opening section, and another passage section, which is located on an opposite radial side of the separation tube, which is opposite to the nose, is defined as a second opening section, and a passage cross-sectional area of the second opening section is larger than a passage cross-sectional area of the first opening section;
the air guide plate has:
a first surface which is adjacent to the first opening section;
a second surface which is adjacent to the second opening section and is farther from the bellmouth than the first surface; and
a connection surface which connects between the first surface and the second surface respectively placed at different axial locations; and
a passage cross-sectional area of a portion of the second opening section, which is located on a side of the impeller where the air guide plate is placed, is larger than a passage cross-sectional area of a portion of the first opening section, which is located on the side of the impeller where the air guide plate is placed.

2. A single suction centrifugal blower that is configured to be installed to a two-layer flow air conditioning system and is operable to simultaneously suction inside air from an inside of a vehicle cabin and outside air from an outside of the vehicle cabin while keeping the inside air and the outside air separated from each other, the centrifugal blower comprising:
an inside/outside air box that has an outside-air inlet, into which the outside air from the outside of the vehicle cabin is introduced, and an inside-air inlet, into which the inside air from the inside of the vehicle cabin is introduced;
an impeller that is configured to be rotated by an electric motor such that the impeller suctions air introduced into the inside/outside air box from one side of the impeller in an axial direction of a rotational axis of the impeller and discharges the air toward an outer side of the impeller in a radial direction of the impeller;
a scroll casing that surrounds the impeller from a radially outer side of the impeller, wherein the scroll casing forms an air passage having a passage cross-sectional area that is progressively increased from a nose, which is formed at a portion of an outer periphery of the scroll casing, toward one side in a circumferential direction of the scroll casing;
a bellmouth that is shaped in a form of a ring and is formed at an end surface of the scroll casing located at an end of the scroll casing in the axial direction of the impeller, wherein the bellmouth forms a suction inlet through which the air is drawn toward the impeller;
a partition wall that partitions the air passage, which is located on an outer side of the impeller in the radial direction, into an upper air passage, which is located on one side of the partition wall in the axial direction of the impeller, and a lower air passage, which is located on another side of the partition wall in the axial direction of the impeller; and
a separation tube that has:
an air guide plate which is located in a part of a region on a side of the impeller where the inside/outside air box is placed; and
a tubular portion which extends from an air inlet of the air guide plate through a location on a radially inner side of the impeller and expands outward in the radial direction, wherein:

a flow of the air, which is conducted from the inside/outside air box to the air guide plate, is drawn into the air inlet and flows through an inside of the tubular portion and then flows to the lower air passage through the impeller, and another flow of the air, which is conducted from the inside/outside air box to a region outside of the air guide plate, flows through an outside of the tubular portion and then flows to the upper air passage through the impeller;

in a cross section of a flow passage formed to conduct the flow of the air from the inside/outside air box to the upper air passage while the cross section of the flow passage is taken along an imaginary plane which includes an outer edge of the air guide plate and is parallel to the rotational axis of the impeller, a passage section, which is located on one radial side of the separation tube where the nose is placed, is defined as a first opening section, and another passage section, which is located on an opposite radial side of the separation tube, which is opposite to the nose, is defined as a second opening section, and a passage cross-sectional area of the second opening section is larger than a passage cross-sectional area of the first opening section;

the air guide plate is tilted relative to the bellmouth such that a portion of the air guide plate, which is adjacent to the second opening section, is farther from the bellmouth than another portion of the air guide plate, which is adjacent to the first opening section; and a passage cross-sectional area of a portion of the second opening section, which is located on a side of the impeller where the air guide plate is placed, is larger than a passage cross-sectional area of a portion of the first opening section, which is located on the side of the impeller where the air guide plate is placed.

3. The single suction centrifugal blower according to claim 2, wherein a portion of the air guide plate, which is located on a radially outer side of the air inlet, is shaped in a form of a slope such that a rate of inclination of the slope relative to the bellmouth is constant in a circumferential direction of the air inlet.

4. A single suction centrifugal blower that is configured to be installed to a two-layer flow air conditioning system and is operable to simultaneously suction inside air from an inside of a vehicle cabin and outside air from an outside of the vehicle cabin while keeping the inside air and the outside air separated from each other, the centrifugal blower comprising:

an inside/outside air box that has an outside-air inlet, into which the outside air from the outside of the vehicle cabin is introduced, and an inside-air inlet, into which the inside air from the inside of the vehicle cabin is introduced;

an impeller that is configured to be rotated by an electric motor such that the impeller suctions air introduced into the inside/outside air box from one side of the impeller in an axial direction of a rotational axis of the impeller and discharges the air toward an outer side of the impeller in a radial direction of the impeller;

a scroll casing that surrounds the impeller from a radially outer side of the impeller, wherein the scroll casing forms an air passage having a passage cross-sectional area that is progressively increased from a nose, which is formed at a portion of an outer periphery of the scroll casing, toward one side in a circumferential direction of the scroll casing;

a bellmouth that is shaped in a form of a ring and is formed at an end surface of the scroll casing located at an end of the scroll casing in the axial direction of the impeller, wherein the bellmouth forms a suction inlet through which the air is drawn toward the impeller;

a partition wall that partitions the air passage, which is located on an outer side of the impeller in the radial direction, into an upper air passage, which is located on one side of the partition wall in the axial direction of the impeller, and a lower air passage, which is located on another side of the partition wall in the axial direction of the impeller; and a separation tube that has:
an air guide plate which is located in a part of a region on a side of the impeller where the inside/outside air box is placed; and
a tubular portion which extends from an air inlet of the air guide plate through a location on a radially inner side of the impeller and expands outward in the radial direction, wherein:

a flow of the air, which is conducted from the inside/outside air box to the air guide plate, is drawn into the air inlet and flows through an inside of the tubular portion and then flows to the lower air passage through the impeller, and another flow of the air, which is conducted from the inside/outside air box to a region outside of the air guide plate, flows through an outside of the tubular portion and then flows to the upper air passage through the impeller;

in a cross section of a flow passage formed to conduct the flow of the air from the inside/outside air box to the upper air passage while the cross section of the flow passage is taken along an imaginary plane which includes an outer edge of the air guide plate and is parallel to the rotational axis of the impeller, a passage section, which is located on one radial side of the separation tube where the nose is placed, is defined as a first opening section, and another passage section, which is located on an opposite radial side of the separation tube, which is opposite to the nose, is defined as a second opening section, and a passage cross-sectional area of the second opening section is larger than a passage cross-sectional area of the first opening section;

a connection between the air guide plate and the tubular portion is configured such that a radius of curvature of a portion of the connection, which is adjacent to the second opening section, is smaller than a radius of curvature of another portion of the connection, which is adjacent to the first opening section; and a passage cross-sectional area of a portion of the second opening section, which is located on a side of the impeller where the air guide plate is placed, is larger than a passage cross-sectional area of a portion of the first opening section, which is located on the side of the impeller where the air guide plate is placed.

5. A single suction centrifugal blower that is configured to be installed to a two-layer flow air conditioning system and is operable to simultaneously suction inside air from an inside of a vehicle cabin and outside air from an outside of the vehicle cabin while keeping the inside air and the outside air separated from each other, the centrifugal blower comprising:

an inside/outside air box that has an outside-air inlet, into which the outside air from the outside of the vehicle cabin is introduced, and an inside-air inlet, into which the inside air from the inside of the vehicle cabin is introduced;

an impeller that is configured to be rotated by an electric motor such that the impeller suctions air introduced into the inside/outside air box from one side of the impeller in an axial direction of a rotational axis of the impeller and discharges the air toward an outer side of the impeller in a radial direction of the impeller;

a scroll casing that surrounds the impeller from a radially outer side of the impeller, wherein the scroll casing forms an air passage having a passage cross-sectional area that is progressively increased from a nose, which is formed at a portion of an outer periphery of the scroll casing, toward one side in a circumferential direction of the scroll casing;

a bellmouth that is shaped in a form of a ring and is formed at an end surface of the scroll casing located at an end of the scroll casing in the axial direction of the impeller, wherein the bellmouth forms a suction inlet through which the air is drawn toward the impeller;

a partition wall that partitions the air passage, which is located on an outer side of the impeller in the radial direction, into an upper air passage, which is located on one side of the partition wall in the axial direction of the impeller, and a lower air passage, which is located on another side of the partition wall in the axial direction of the impeller; and a separation tube that has:
  an air guide plate which is located in a part of a region on a side of the impeller where the inside/outside air box is placed; and
  a tubular portion which extends from an air inlet of the air guide plate through a location on a radially inner side of the impeller and expands outward in the radial direction, wherein:

a flow of the air, which is conducted from the inside/outside air box to the air guide plate, is drawn into the air inlet and flows through an inside of the tubular portion and then flows to the lower air passage through the impeller, and another flow of the air, which is conducted from the inside/outside air box to a region outside of the air guide plate, flows through an outside of the tubular portion and then flows to the upper air passage through the impeller;

in a cross section of a flow passage formed to conduct the flow of the air from the inside/outside air box to the upper air passage while the cross section of the flow passage is taken along an imaginary plane which includes an outer edge of the air guide plate and is parallel to the rotational axis of the impeller, a passage section, which is located on one radial side of the separation tube where the nose is placed, is defined as a first opening section, and another passage section, which is located on an opposite radial side of the separation tube, which is opposite to the nose, is defined as a second opening section, and a passage cross-sectional area of the second opening section is larger than a passage cross-sectional area of the first opening section;

an outer edge of the inside/outside air box and another outer edge of the air guide plate are located on an outer side of an outer edge of the scroll casing;

an outer flow passage is formed such that the outer flow passage has a region, which is located on an outer side of the outer periphery of the scroll casing in the radial direction and is located on an opposite side of the bellmouth that is opposite to the air guide plate; and a portion of the air introduced to the inside/outside air box is drawn from the second opening section into the impeller through the outer flow passage.

6. The single suction centrifugal blower according to claim 5, wherein:

a center of the inside/outside air box is placed at a location that is displaced from the rotational axis of the impeller and a central axis of the tubular portion of the separation tube toward the second opening section; and a passage cross-sectional area of a portion of the second opening section, which is located on a side of the impeller where the air guide plate is placed, is larger than a passage cross-sectional area of a portion of the first opening section, which is located on the side of the impeller where the air guide plate is placed.

* * * * *